(12) United States Patent
Gundavelli et al.

(10) Patent No.: US 11,444,914 B2
(45) Date of Patent: Sep. 13, 2022

(54) QUALITY OF SERVICE (QOS) POLICY SELECTION AND FLOW CREATION BASED ON DOMAIN NAME SYSTEM (DNS) APPLICATION METADATA

(71) Applicant: Cisco Technology, Inc., San Jose, CA (US)

(72) Inventors: Srinath Gundavelli, San Jose, CA (US); Vimal Srivastava, Bangalore (IN); Indermeet Singh Gandhi, San Jose, CA (US); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/132,069

(22) Filed: Dec. 23, 2020

(65) Prior Publication Data
US 2022/0200948 A1    Jun. 23, 2022

(51) Int. Cl.
*H04L 61/4511* (2022.01)
*H04W 24/04* (2009.01)
*H04W 84/04* (2009.01)

(52) U.S. Cl.
CPC ......... *H04L 61/4511* (2022.05); *H04W 24/04* (2013.01); *H04W 84/042* (2013.01)

(58) Field of Classification Search
CPC .. H04L 61/1511; H04W 24/04; H04W 84/042
(Continued)

(56) References Cited

U.S. PATENT DOCUMENTS 6,167,445 A * 12/2000 Gai ...................... H04L 41/0893
709/223
9,344,348 B2    5/2016 Ivanov et al.
(Continued)

FOREIGN PATENT DOCUMENTS

WO    2018145103 A1    8/2018
WO    2019129112 A1    7/2019
(Continued)

OTHER PUBLICATIONS

J. Damas et al., "Extension Mechanisms for DNS (EDNS(0))", Internet Engineering Task Force (IETF), Request for Comments: 6891, STD: 75, Obsoletes: 2671, 2673, Category: Standards Track, ISSN: 2070-1721, Apr. 2013, 16 pages.
(Continued)

*Primary Examiner* — Hermon Asres
(74) *Attorney, Agent, or Firm* — Edell, Shapiro & Finnan, LLC

(57) ABSTRACT

In one illustrative example, a user plane function (UPF) configured for use in a private 5G network of an enterprise may receive, from a user device, a domain name system (DNS) query associated with an application; send, to a DNS server, one or more corresponding DNS queries based on the DNS query; receive, from the DNS server, one or more DNS query responses which include an IP address and metadata including an application identifier for the application; and send, to a control plane function, a message for reporting which includes the application identifier. In response, a dedicated Quality of Service (QoS) Flow may be created for traffic for the application according to a selected QoS policy associated with the application identifier. For obtaining the metadata, the UPF may interact with a DNS server configured with Extension mechanisms for DNS (EDNS) or a DNS as Authoritative Source (DNS-AS) mechanism.

20 Claims, 19 Drawing Sheets

(58) Field of Classification Search
USPC .......................................................... 709/245
See application file for complete search history.

(56) References Cited

U.S. PATENT DOCUMENTS

| | | | |
|---|---|---|---|
| 10,701,582 B2 | 6/2020 | Henry et al. | |
| 2011/0170411 A1 | 7/2011 | Wang et al. | |
| 2016/0164825 A1 | 6/2016 | Riedel et al. | |
| 2016/0164826 A1* | 6/2016 | Riedel | H04L 61/1511 709/223 |
| 2019/0253917 A1 | 8/2019 | Dao | |
| 2020/0128503 A1 | 4/2020 | Li et al. | |
| 2020/0329008 A1* | 10/2020 | Dao | G06F 16/953 |

FOREIGN PATENT DOCUMENTS

| | | |
|---|---|---|
| WO | 2019158218 A1 | 8/2019 |
| WO | 2019214831 A1 | 11/2019 |
| WO | 2020020461 A1 | 1/2020 |
| WO | 2020127148 A1 | 6/2020 |

OTHER PUBLICATIONS

Cisco, "Cisco Umbrella: DNS Security Essentials Package", downloaded Nov. 25, 2020, 4 pages.
Disco, "Cisco Umbrella: Secure Internet Gateway (SIG) Essentials Package", Aug. 2020, 8 pages.
Cisco, "Cisco Umbrella: The Rise of the Secure Internet Gateway", White Paper, downloaded Nov. 25, 2020, 11 pages.
Cisco, "The Cisco Umbrella Advantage", EBook, downloaded Nov. 25, 2020, 15 pages.
Riedel, Wolfgang, "Done with SDN and Tired of Dealing with Snowflake Network Complexity? Change the Game with a Simple TXT String", BRKCRS-2321, Nov. 22, 2015, 80 pages.
Cisco, "DNS-AS", downloaded Nov. 25, 2020, 22 pages.
3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 439 pages.
"Chapter: DNS Snooping," Cisco, ECS Administration Guide, StarOS Release 21, https://www.cisco.com/c/en/us/td/docs/wireless/asr_5000/21/ECS/21-ECS-Admin/21-ECS-Admin_chapter_01100.html, Updated: Oct. 27, 2016, 9 pages.

* cited by examiner

| APPLICATION NAME | RELEVANCY |
|---|---|
| youtube | BUSINESS - IRRELEVANT |
| Sharepoint | BUSINESS - RELEVANT |
| Webex | BUSINESS - RELEVANT |

EXAMPLE MAPPING AT CONTROL PLANE FUNCTION (OR CONTROLLER)

| APPLICATION NAME | RELEVANCY | AppID | TYPE | 5QI | RESOURCE-TYPE | PACKET ERROR RATE | PACKET DELAY BUDGET | IEEE 802.11 UP |
|---|---|---|---|---|---|---|---|---|
| youtube | BUSINESS-IRRELEVANT | 56 | MULTIMEDIA-STREAMING | 6 | NON-GBR | $10^{-6}$ | 300 ms | 0 |
| Custom-eMBB | BUSINESS-RELEVANT | 34 | TRANSACTIONAL-DATA | 6 | GBR | $10^{-6}$ | 10 ms | 4 |
| Webex | BUSINESS-RELEVANT | 22 | MULTIMEDIA CONFERENCING | 2 | GBR | $10^{-3}$ | 150 ms | 6 |

| URL | APPLICATION NAME | RELEVANCY | AppID | TYPE | 5QI | RESOURCE-TYPE | PACKET ERROR RATE | PACKET DELAY BUDGET | IEEE 802.11 UP |
|---|---|---|---|---|---|---|---|---|---|
| URL 1 | youtube | BUSINESS-IRRELEVANT | 56 | MULTIMEDIA-STREAMING | 6 | NON-GBR | $10^{-6}$ | 300 ms | 0 |
| URL 2 | Custom-eMBB | BUSINESS-RELEVANT | 34 | TRANSACTIONAL-DATA | 6 | GBR | $10^{-6}$ | 10 ms | 4 |
| URL 3 | Webex | BUSINESS-RELEVANT | 22 | MULTIMEDIA CONFERENCING | 2 | GBR | $10^{-6}$ | 150 ms | 6 |

EXAMPLE MAPPING AT DNS AS AN AUTHORITATIVE SOURCE (DNS-AS)

RECORD FOR DNS-AS (5QI, RESOURCE TYPE, PER, PDB FOR 5G UP FOR WI-FI)

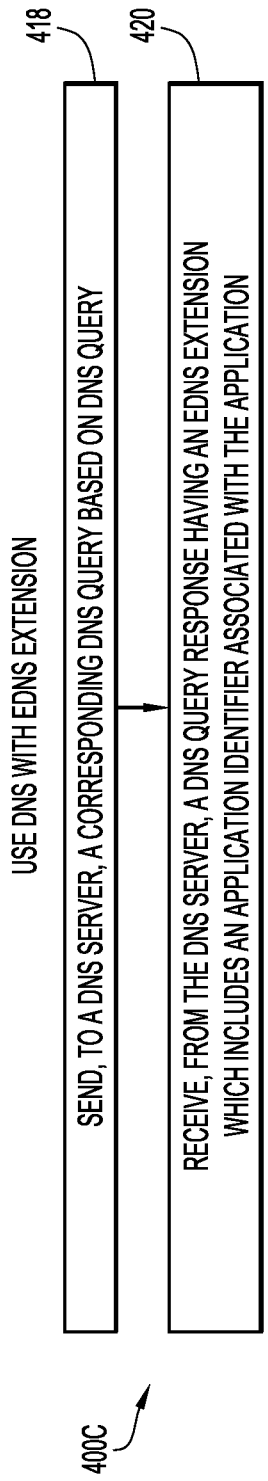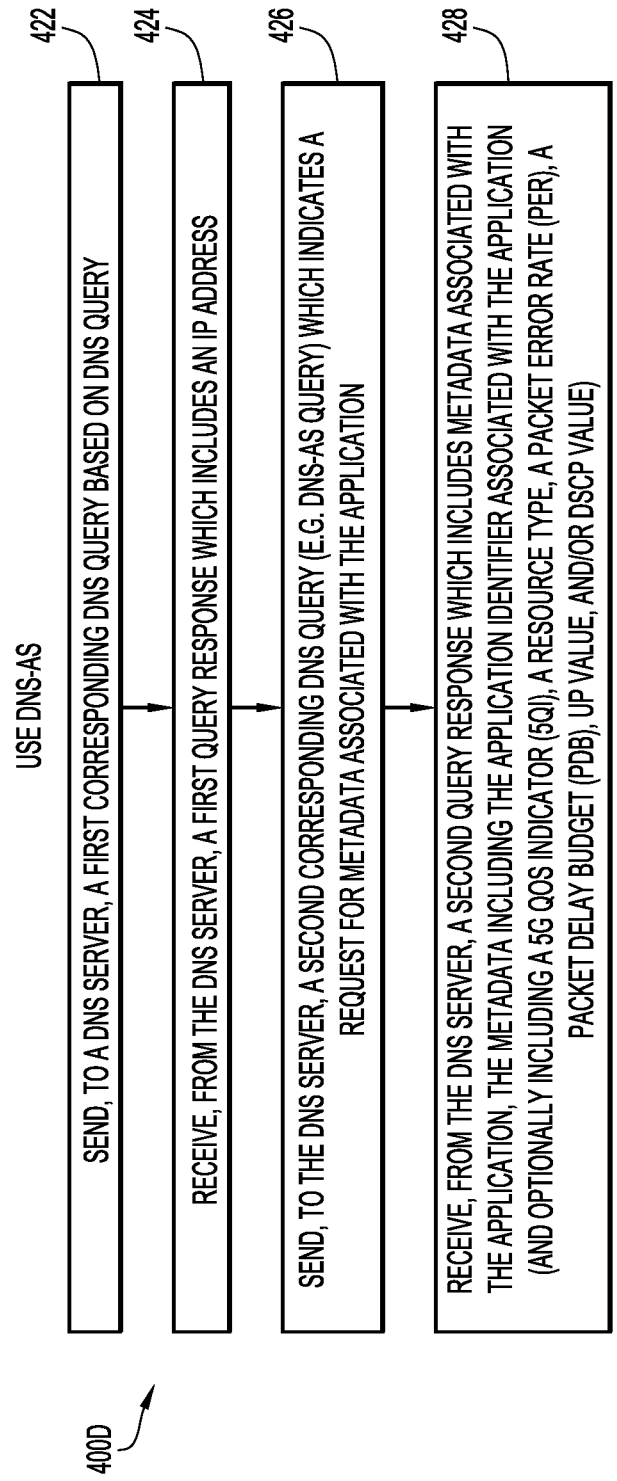

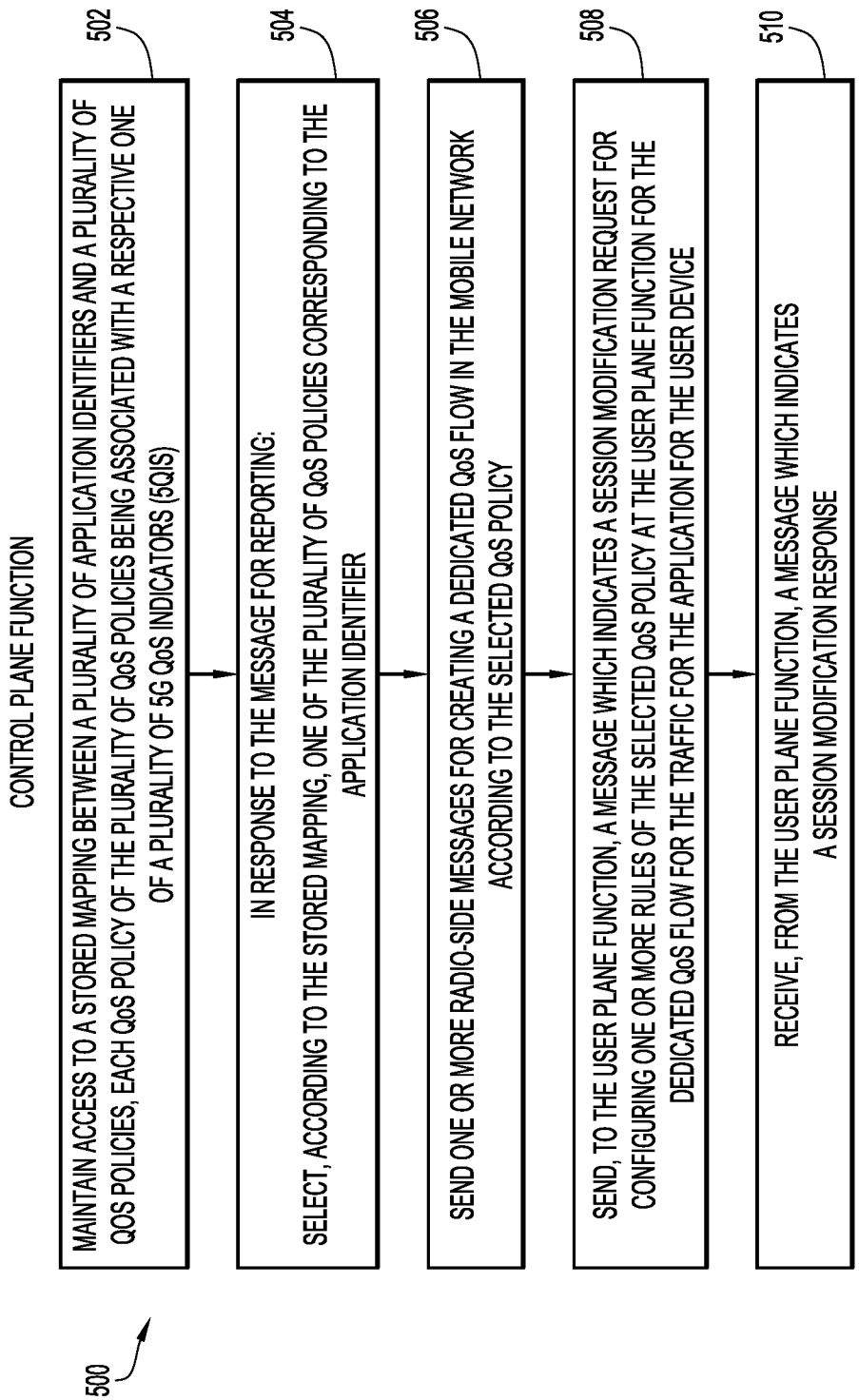

| UP | DESIGNATION | CATEGORY (AC) | CATEGORY (INFORMATIVE) |
|---|---|---|---|
| 1 | BK | AC_BK | BACKGROUND |
| 2 | - | AC_BK | BACKGROUND |
| 0 | BE | AC_BE | BEST EFFORT |
| 3 | EE | AC_BE | BEST EFFORT |
| 4 | CL | AC_VI | VIDEO |
| 5 | VI | AC_VI | VIDEO |
| 6 | VO | AC_VO | VIDEO |
| 7 | NC | AC_VO | VIDEO |

LOWEST → HIGHEST

QUALITY OF SERVICE (QOS) POLICY SELECTION AND FLOW CREATION BASED ON DOMAIN NAME SYSTEM (DNS) APPLICATION METADATA

TECHNICAL FIELD

The present disclosure relates to telecommunication systems, and in particular, to techniques and mechanisms for Quality of Service (QoS) policy selection and QoS flow creation based on domain name system (DNS) application metadata in a mobile or wireless network.

BACKGROUND

An enterprise network deployment may include an enterprise private Third Generation Partnership project (3GPP) based network, such as a private Fifth Generation (5G) network for "private 5G." Such enterprise deployments may have mission-critical devices, Internet of Things (IoT) devices, and/or robotics devices, where application-specific Quality of Service (QoS) treatment, low latency, and reliability are key considerations.

Private 5G inherits the concept of a QoS Flow from the standard 5G System (5GS) architecture. A QoS Flow starts at a User Plane Function (UPF) and extends to a gNodeB (gNB), where it is mapped to a radio bearer/QoS Flow to a User Equipment (UE). A session at the UPF may be managed by a Session Management Function (SMF) over an N4 interface.

Each QoS Flow may be associated with a particular QoS classification and treatment on an Internet Protocol (IP) or application flow basis. Parameters that define a QoS Flow include a 5G QoS Class Identifier (QCI), called 5QI, such that packets can be classified into different QoS classes. Other parameters that may define a QoS Flow include a Guaranteed Bit Rate (GBR), a Maximum Bit Rate (MBR), a Guaranteed Flow Bit Rate (GFBR), a Packet Delay Budget (PDB), and a Delay-Critical GBR. A GBR-type QoS Flow guarantees that a specific minimum bit rate is always available on that flow.

With the growing base of enterprise applications that utilize end-to-end encryption, it is difficult for the network to have a clear visibility of the applications being utilized. It is therefore challenging to select the proper QoS treatment to traffic associated with these applications. Relying on deep packet inspection (DPI) to detect all of these applications for proper QoS treatment is not optimal, as relatively high computational processing is required.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3A is a table for representing a mapping of stored associations between application identifiers (IDs) of applications and business intents of the private 5G network of FIGS. 1A-1B, which may be provided from a network controller to the control plane function of the private 5G network;

FIG. 3B is a table for representing a mapping of stored associations between the plurality of application IDs of the applications and a plurality of 5G Quality of Service (QoS) Class Identifiers (QCIs) or 5QIs associated with QoS policies of the applications;

FIG. 3C is a table for representing a mapping of stored associations between a plurality of Uniform Resource Locators (URLs) (and hence, DNS records) and a plurality of application IDs associated with the applications (and/or other application-relevant data items);

FIGS. 4C-4D are flowcharts for describing methods of obtaining DNS application metadata for use with the method of FIGS. 4A-4B;

FIG. 5 is a flowchart for describing a method of QoS policy selection and QoS flow creation based on DNS application metadata in a mobile network according to some implementations of the present disclosure, which may be performed at a control plane function or SMF;

FIG. 11 is a table for showing a mapping between User Priority (UP) values and access categories of different applications for use in a wireless network.

DESCRIPTION OF EXAMPLE EMBODIMENTS

Figure 1A:
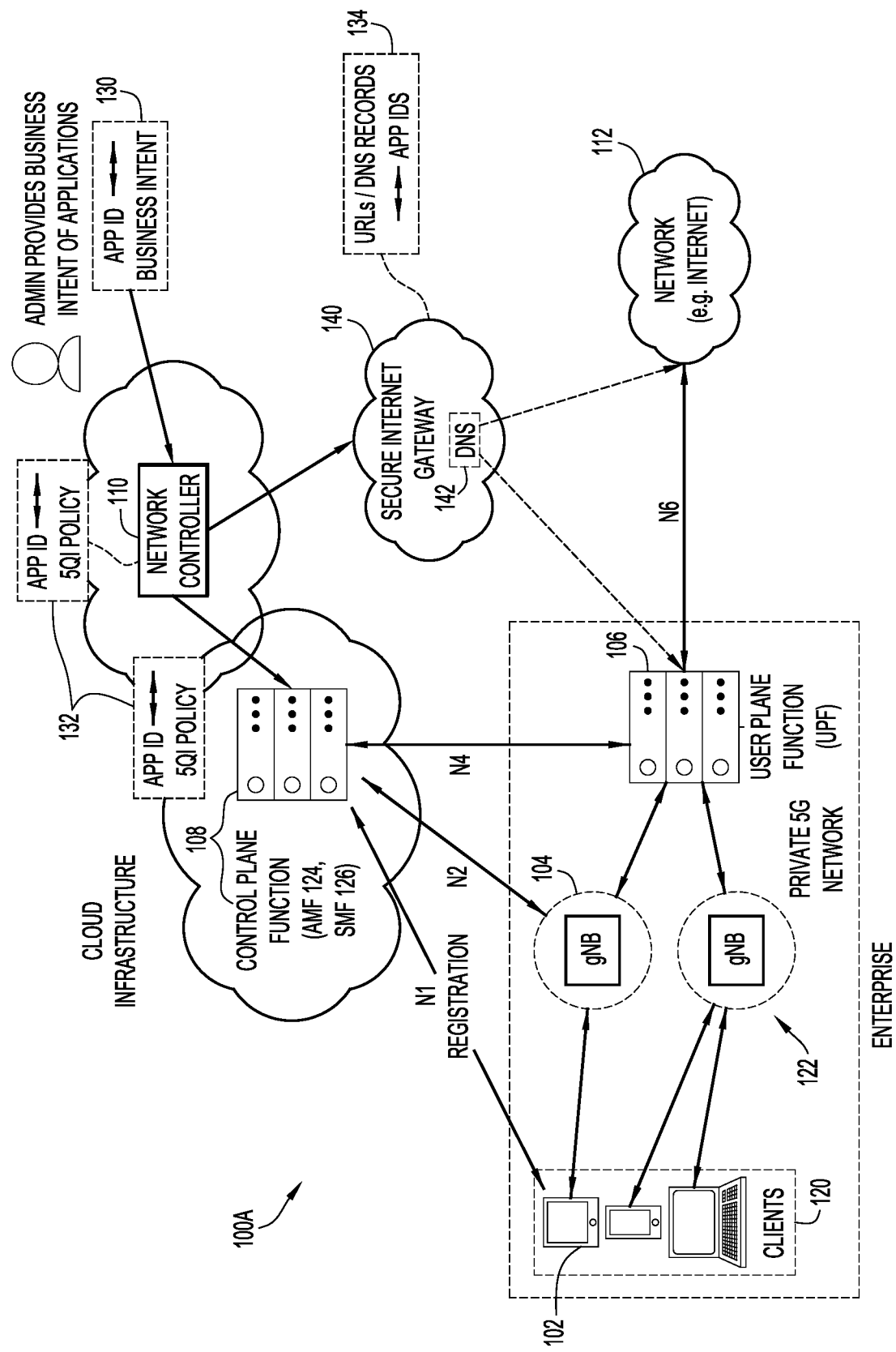
FIG. 1A is an illustrative representation of a basic network architecture of an enterprise private network which includes a mobile network, and more particularly, a private Fifth Generation (5G) network which may utilize a user plane function (UPF) and a control plane function (e.g. a session management function or "SMF")

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for Quality of Service (QoS) policy selection and QoS flow creation based on domain name system (DNS) application metadata in a mobile or wireless network (e.g. of a private enterprise) are described herein.

In one illustrative example, a user plane function (UPF) configured for use in a private Fifth Generation (5G) network of an enterprise may receive, from a user device, a DNS query associated with an application; send, to a DNS server, one or more corresponding DNS queries based on the DNS query; receive, from the DNS server, one or more DNS query responses which include an IP address and metadata including an application identifier for the application; and send, to a control plane function, a message for reporting which includes the application identifier. In response, a dedicated QoS Flow may be created (e.g. by the control plane function) for traffic for the application associated with the user device according to a selected QoS policy associated with the application identifier. In some implementations, the metadata may additionally or alternatively include one or more QoS parameters or indications. For obtaining the metadata, the UPF may interact with a DNS server which implements Extension mechanisms for DNS (EDNS) or DNS as Authoritative Source (DNS-AS). As is apparent, the receipt of the DNS response/metadata and/or the subsequent message for reporting may be utilized as a trigger for the creation of the dedicated QoS Flow.

In another illustrative example, the techniques and mechanisms of the present disclosure may be implemented in a wireless local area network (LAN) or WLAN of an enterprise. A controller (e.g. a wireless LAN controller or "WLC") or an access point (AP) of the wireless LAN may be configured to operate in a correspondingly similar manner as described above. The controller or access point may receive, from a user device in communication with the access point, a DNS query associated with an application; send, to a DNS server, one or more corresponding DNS queries based on the DNS query; receive, from the DNS server, one or more DNS query responses which include an IP address and metadata including an application identifier for the application; and set, in the access point, a prioritized queuing of traffic for the application according to a selected User Priority (UP) value associated with the application identifier. In some implementations, the metadata may additionally or alternatively include the selected UP value. A Differentiated Services Code Point (DSCP) value may be provided along with the UP value. For obtaining the metadata, the WLC may interact with a DNS server which implements EDNS or a DNS-AS mechanism. As is apparent, the receipt of the DNS response/metadata may be utilized as a trigger for the creation of policy or QoS treatment.

More detailed and alternative techniques and implementations are provided herein as described below.

EXAMPLE EMBODIMENTS

As described earlier in the Background section, an enterprise network deployment may include an enterprise private Third Generation Partnership project (3GPP) based network, such as a private Fifth Generation (5G) network for "private 5G." Such enterprise deployments may have mission-critical devices, Internet of Things (IoT) devices, and/or robotics devices, where application-specific Quality of Service (QoS) treatment, low latency, and reliability are key considerations.

To better illustrate, FIG. 1A is an illustrative representation of a network architecture 100A of an enterprise private network for an enterprise, which is, more specifically, a private 5G network. Relatedly, FIG. 1B shows a network architecture 100B of the private 5G network of FIG. 1A as a simplified, schematic block diagram.

Figure 1B:
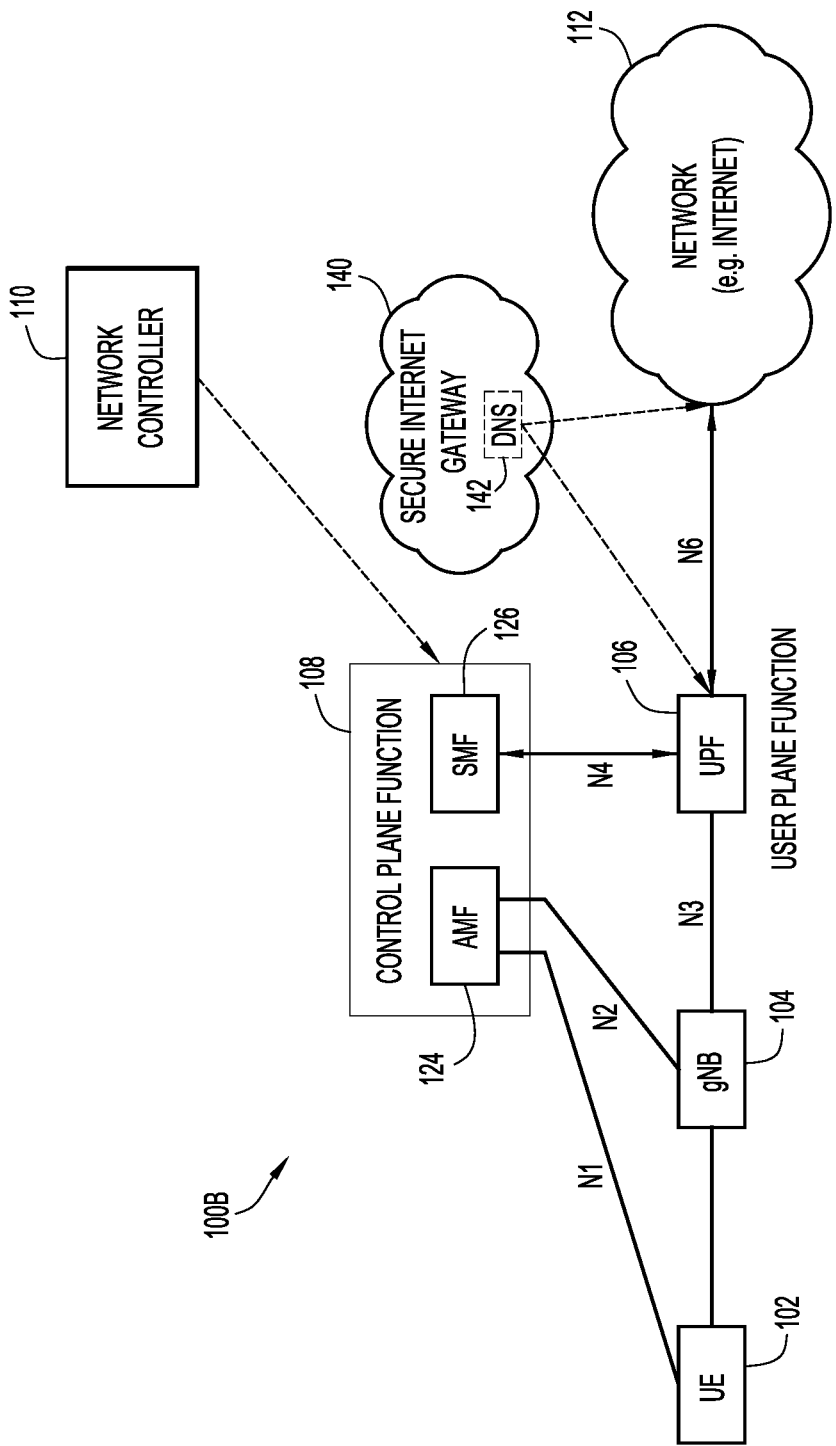
FIG. 1B shows the network architecture of the private 5G network of FIG. 1A as a simplified, schematic block diagram.

The private 5G network may utilize the network architecture 100A/100B in FIGS. 1A-1B to facilitate communications for a plurality of clients 120. Clients 120 may be user devices or user equipments (UEs), such as a UE 102. The user device or UE 102 may be any suitable type of device, such as a cellular telephone, a smart phone, a tablet device, an IoT device, a Machine-to-Machine (M2M) device, a robotics device, and a sensor, etc. UE 102 may obtain access to the private 5G network via one or more base stations or gNodeBs (gNBs) 122, such as a gNB 104. In some implementations, each gNB may be provided as a plurality of disaggregated elements in a virtualized radio access network (vRAN) architecture, for example, including a radio unit (RU), a distributed unit (DU), and a central unit (CU). A user plane function (UPF) 106 may be used to carry traffic for an application for UE 102. For example, UPF 106 may carry uplink (UL) and downlink (DL) traffic between UE 102 operating in the private 5G network and a network 112, such as the Internet.

A control plane function(s) 108 of a control plane may be utilized in the private 5G network for access and mobility management, session management, and/or policy management and control, etc., for UEs. In particular, control plane function 108 may include an Access and Mobility Management Function (AMF) 124 and a Session Management Function (SMF) 126. AMF 124 and SMF 126 may be implemented as separate functions or components, or alternatively provided together as an integrated functionality (in whole or in part) and/or co-located at the same node or component. A protocol data unit (PDU) session at UPF 106 may be managed by SMF 126 over an N4 interface using a Packet Forwarding Control Protocol (PFCP). In some implementations, control plane function 108 is provided locally in the private 5G network. In other implementations, control plane function 108 is provided as part of a cloud infrastructure. In some implementations, the private 5G network may be configured without use of a Policy and Control Function (PCF) (e.g. such as that configuration shown and described herein except where noted); rather, the private 5G network may provide policy control with use of network controller 110 and/or control plane function 108 as described herein.

Operation, functionality, and protocols utilized in the private 5G network may at least generally conform to 3GPP standards for 5G (e.g. 3GPP Technical Specifications or "TS" 23.501 and 23.502), except where adapted and described herein according to the present disclosure. A plurality of interfaces and/or reference points N1, N2, N3, N4, and N5 shown in FIGS. 1A-1B (and others) may represent the communications and/or protocols between each of the entities, as is known by the relevant (evolving) standards documents.

A network controller 110 may also be provided for managing the private 5G network. More particularly, network controller 110 may be provided in the private 5G network for managing and controlling policy and configuration in the private 5G network. In some implementations, network controller 110 is provided locally in the private 5G network. In other implementations, network controller 110 is provided as part of a cloud infrastructure. In one example, the cloud infrastructure having network controller 110 may be referred to as a cloud manager or a management cloud. In some implementations, network controller 110 may be provided as part of an enterprise policy function such as Authentication, Authorization and Accounting (AAA).

In some implementations, network controller 110 in the cloud infrastructure is operative to provide management and control over policy and configuration according to intent-based networking. The motivation of intent-based networking is to enable a user to describe in plain language what he or she wants to accomplish (e.g. the user's intent) and have the network translate the user's objective into configuration and policy changes that may be automatically propagated across a heterogeneous computing environment. An intent-based network operates to abstract network complexity, automate much of the work of provisioning and managing the network typically handled by a network administrator, and assure secure operation and optimal performance of the network. In some implementations, network controller 110 in the cloud infrastructure may be or include a Cisco Digital Network Architecture (Cisco DNA™).

As described above, UPF 106 may be used to carry traffic for an application for UE 102. For example, UPF 106 may carry UL and DL traffic between UE 102 and network 112 (e.g. the Internet). For a given application of UE 102, a domain name system (DNS) server 142 may be used for address resolution and for metadata associated with the application. In some implementations, communications between UPF 106 and network 112 (e.g. the Internet) may be routed via a gateway 140 which is part of a cloud infrastructure. In some implementations, DNS server 142 may be provided as part of gateway 140 of the cloud infrastructure. In some preferred implementations, gateway 140 is a Secure Internet Gateway (SIG) or SIG platform which includes DNS server 142 and one or more security functions. Here, communications via gateway 140 (e.g. including DNS query requests and responses) may be performed over a secure encrypted channel, such as an Internet Protocol Security (IPsec) tunnel or a Transport Layer Security (TLS) tunnel.

Figure 2A:
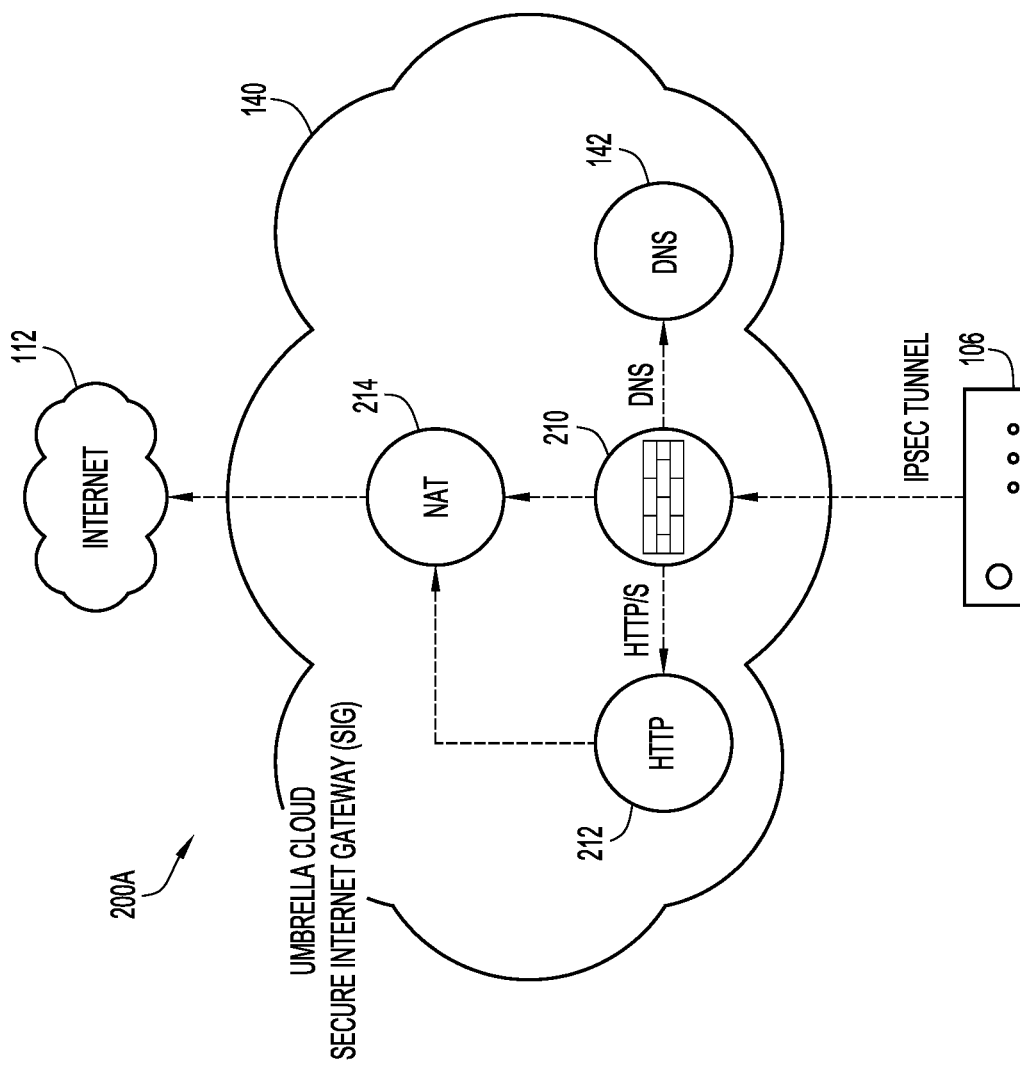
FIG. 2A is an illustrative representation of a gateway (or a Secure Internet Gateway "SIG") which includes a domain name system (DNS) server for use with the enterprise private network of FIGS. 1A-1B, where the DNS server may be configured with Extensions mechanisms for DNS (EDNS) or a DNS as an Authoritative Source (AS) (DNS-AS) mechanism.

FIG. 2A is an illustrative diagram 200A of gateway 140 (or the secure internet gateway or "SIG") of FIGS. 1A-1B according to some implementations. In this example, gateway 140 is part of an umbrella cloud infrastructure ("Umbrella SIG") which provides a cloud-delivered enterprise network security for the enterprise. Communications through gateway 140 may be provided via the secure encrypted channel (e.g. IPsec or TLS tunnel). With use of gateway 140, user devices may be provided with a first line of defense against cybersecurity threats. In this example implementation, gateway 140 includes a firewall server 210, a secure Hypertext Transfer Protocol (HTTP) server 212, a Network Address Translation (NAT) server 214, as well as DNS server 142. In some other implementations, the umbrella cloud infrastructure may be utilized across a plurality of local networks associated with different branches of the enterprise.

In some implementations of the present disclosure, DNS server 142 of FIGS. 1A-1B and 2A may be configured to implement Extension mechanisms for DNS (EDNS) according to Request for Comments (RFC) 6891 for providing metadata associated with applications. In other implementations of the present disclosure, DNS server 142 may be configured with a DNS as Authoritative Source (DNS-AS) mechanism for providing metadata associated with applications.

Figure 2B:
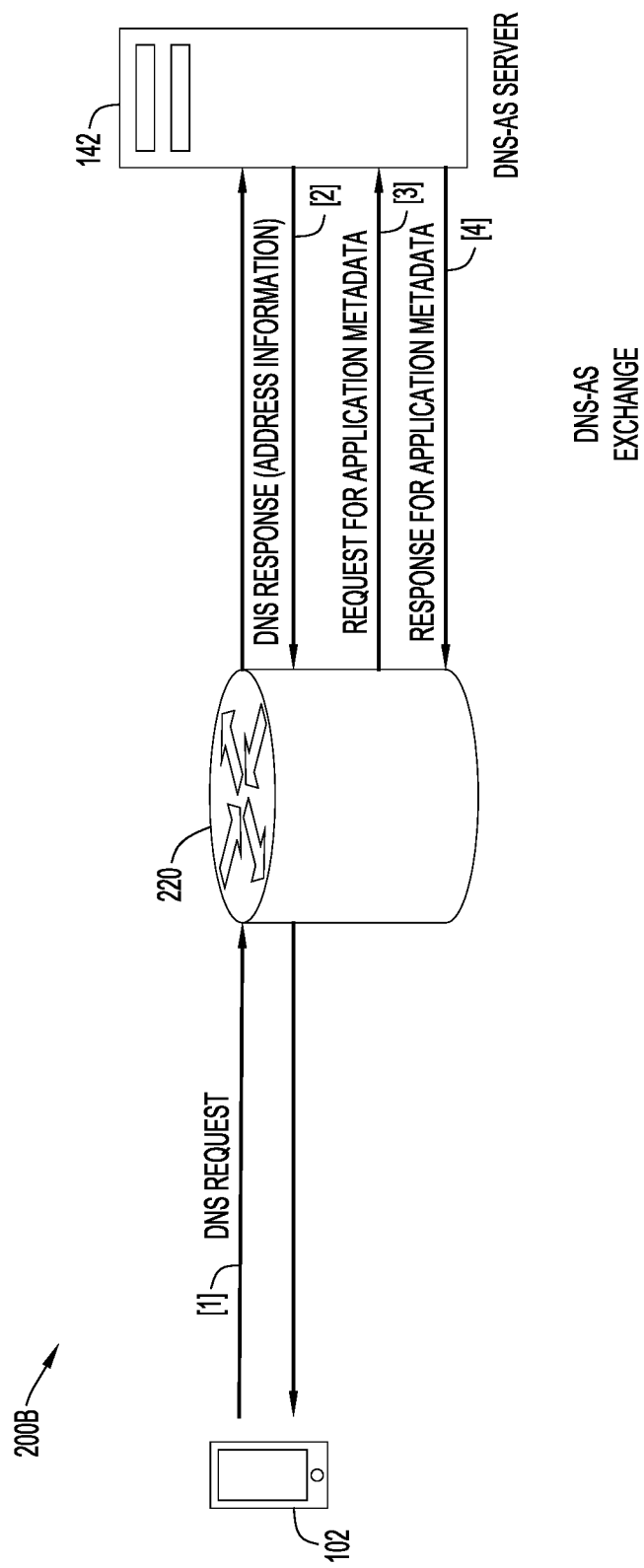
FIG. 2B is a message flow diagram of a message flow involving the DNS server which is configured with the DNS-AS mechanism.

FIG. 2B is a message flow diagram 200B of a message flow involving the DNS server configured with a DNS-AS mechanism. General DNS-AS functionality will now be described. UE 102 may send a DNS request to DNS server 142 via a router 220 (step 1 of FIG. 2B). DNS server 142 may respond with a DNS response having address information (step 2 of FIG. 2B). Router 220 may then send to DNS server 142 a further request for application metadata (step 3 of FIG. 2B). DNS server 142 may respond with a response having the application metadata, providing application classification information to router 220 (step 4 of FIG. 2B). Router 220 may then utilize the application classification information to create custom protocols for classifying specific "trusted domain" application traffic.

With reference back to FIGS. 1A-1B, "private 5G" inherits the concept of a QoS Flow from the standard 5G System (5GS) architecture. A QoS Flow starts at UPF 106 and extends to gNB 104, where it is mapped to a radio bearer/QoS Flow to UE 102. Each QoS Flow is associated with a particular QoS classification and treatment on an Internet Protocol (IP) or application flow basis. Parameters that define a QoS Flow include a 5G QoS Class Identifier (QCI), called 5QI, such that packets can be classified into different QoS classes. Other parameters that may define a QoS Flow include a Guaranteed Bit Rate (GBR), a Maximum Bit Rate (MBR), a Guaranteed Flow Bit Rate (GFBR), a Packet Delay Budget (PDB), and a Delay-Critical GBR. As its name suggests, a GBR-type QoS Flow guarantees that a specific minimum bit rate is always available on that flow.

With the growing base of applications that utilize end-to-end encryption, it is increasingly difficult for the network to have a clear visibility of applications. It is therefore challenging to apply the proper QoS treatment to traffic associated with these applications. Relying on deep packet inspection (DPI) to detect all of these applications for proper QoS treatment is not optimal, as relatively high computational processing would be required.

In some implementations of the present disclosure, what may be utilized in the techniques and mechanisms of the present disclosure is a mapping of stored associations between a plurality of application identifiers (IDs) and/or names of applications (e.g. "5G enterprise applications") and 5QIs and/or corresponding QoS profiles associated with the applications. Other relevant data items may also be associated with this information as described herein, if and as needed. The mapping may be stored at and/or used by a controller or control plane function (e.g. the SMF). In other implementations described later in relation to FIGS. 7-11, applicable to IEEE 802.11 or wireless local area networks (wireless LANs or WLANs, or "Wi-Fi"), a mapping of stored associations between the plurality of application IDs and User Priority (UP) values and/or Differentiated Services Code Point (DSCP) values associated with the applications may be utilized. As is apparent, the network may support different radio access technologies (RATs), and the applications may be associated with QoS parameters for these different RATs. In some preferred implementations for both 5G and Wi-Fi, the mapping of stored associations may include associations between the plurality of application IDs and both the 5QIs/QoS profiles (i.e. for 5G) and the UP values/DSCP values (i.e. for Wi-Fi).

With reference to FIG. 1A, it is illustrated that information for applications may be input (e.g. by a network administrator) and sent by network controller 110 to control plane function 108. The information may include a mapping 130 of stored associations between application IDs (e.g. assigned names or values) associated with the applications and business intents of the enterprise. Control plane function 108 may obtain mapping 130 and use it to build or generate a mapping 132 of stored associations between the plurality of application IDs of the applications and a plurality of 5G QCIs or "5QIs" associated with QoS profiles (see e.g. FIG. 3B). Network controller 110 may use mapping 130 or mapping 132 to build or generate a mapping 134 of stored associations between a plurality of Uniform Resource Locators (URLs) (e.g. associated with DNS records) and the plurality of application IDs (see e.g. FIG. 3C). Mapping 134 may be configured at DNS server 142 which implements the EDNS or DNS-AS mechanism.

To better illustrate and explain, FIG. 3A is a table 300A for representing the mapping 130 of stored associations between application IDs/names and business intents ("relevancy") of the enterprise. In this example, mapping 130 may associate the application IDs (e.g. names) for YouTube, Sharepoint, and WebEx with business intents as to whether or not the service is business-relevant or business-irrelevant. Thus, in some optional implementations, mapping 130 may be provided from network controller 110 to control plane function 108 to build or assist in building the mapping 132 (see FIG. 1A).

FIG. 3B is a table 300B for representing the mapping 132 of stored associations between a plurality of application IDs of the applications and a plurality of 5QIs associated with the applications (and e.g. one or more QoS parameters) according to some implementations. Each one of the plurality of 5QIs may be associated with a respective one of a plurality of different QoS profiles. Mapping 132 of table 300B in FIG. 3B may be stored at control plane function 108 for use with the private 5G network (see FIG. 1A). In FIG. 3B, each entry for an application ID and/or name (e.g. YouTube, Custom-eMBB, or WebEx) may be associated with a 5QI and correspondingly a unique QoS profile. As shown, the application ID and/or name may be associated with a type of service (e.g. multi-media streaming, transaction-data, or multimedia conferencing), a Resource Type (e.g. GBR or non-GBR), a Packet Error Rate ($10^{-6}$, $10^{-6}$, or $10^{-3}$), and a Packet Delay Budget (300 ms, 10 ms, or 150 ms). The application ID and/or name may be additionally or alternatively associated with a Default Priority Level, a Default Maximum Data Burst Volume, and/or a Default Averaging Window. In some implementations, application IDs of applications may be bundled into groups, with each group being associated with a unique 5QI along with associated QoS attributes. For IEEE 802.11 or WLANs, a UP value (e.g. or an IEEE 802.11e UP value) (e.g. 0, 4, or 6) may additionally or alternatively be included in the mapping. On the other hand, mappings may be maintained separately on a RAT basis (e.g. a first mapping table associated with 5G, and a second mapping table associated with Wi-Fi).

A QoS profile of a QoS Flow may include a plurality of QoS parameters: a 5QI; an Allocation and Retention Priority (ARP); for each Non-GBR QoS Flow, a Reflective QoS Attribute (RQA); for each GBR QoS Flow, a GFBR (for UL and DL), and a Maximum Flow Bit Rate (MFBR) (for UL and DL); in the case of a GBR QoS Flow, a notification control, and a Maximum Packet Loss Rate (for UL and DL). Each QoS profile may have one corresponding QFI which is not included in the QoS profile itself. As used herein, a QoS profile may refer to one or more of those QoS parameters or values that are relevant depending on the context or application.

FIG. 3C is a table 300C for representing the mapping 134 of stored associations between the plurality of URLs (e.g. URL 1, URL 2, and URL 3) and the plurality of application IDs/names, information which may be configured at DNS 142 for the EDNS or DNS-AS mechanism according to some implementations. As shown, mapping 134 of the stored associations may include additional data items, including some or all of the data items in the stored mapping 132 in FIG. 3B. Any one or more of these data items (e.g. application ID, 5QI, or UP value) may be provided as metadata by DNS 142 which is configured to operate with use of the EDNS or DNS-AS mechanism according to implementations described herein.

Figure 4A:
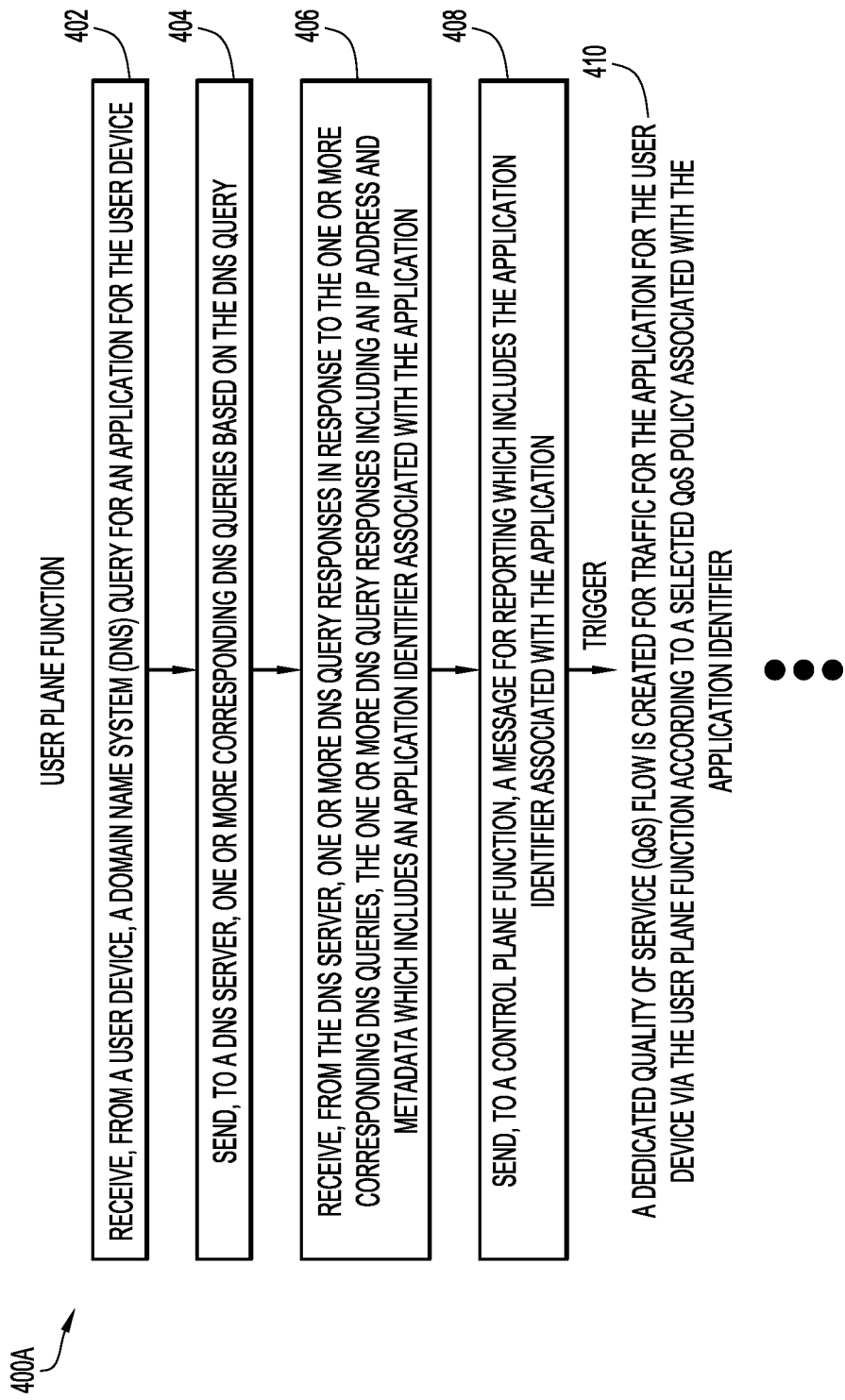
FIGS. 4A-4B are flowcharts for describing a method of QoS policy selection and QoS flow creation based on DNS application metadata in a mobile network according to some implementations of the present disclosure, which may be performed at a user plane function or UPF.
Figure 4B:
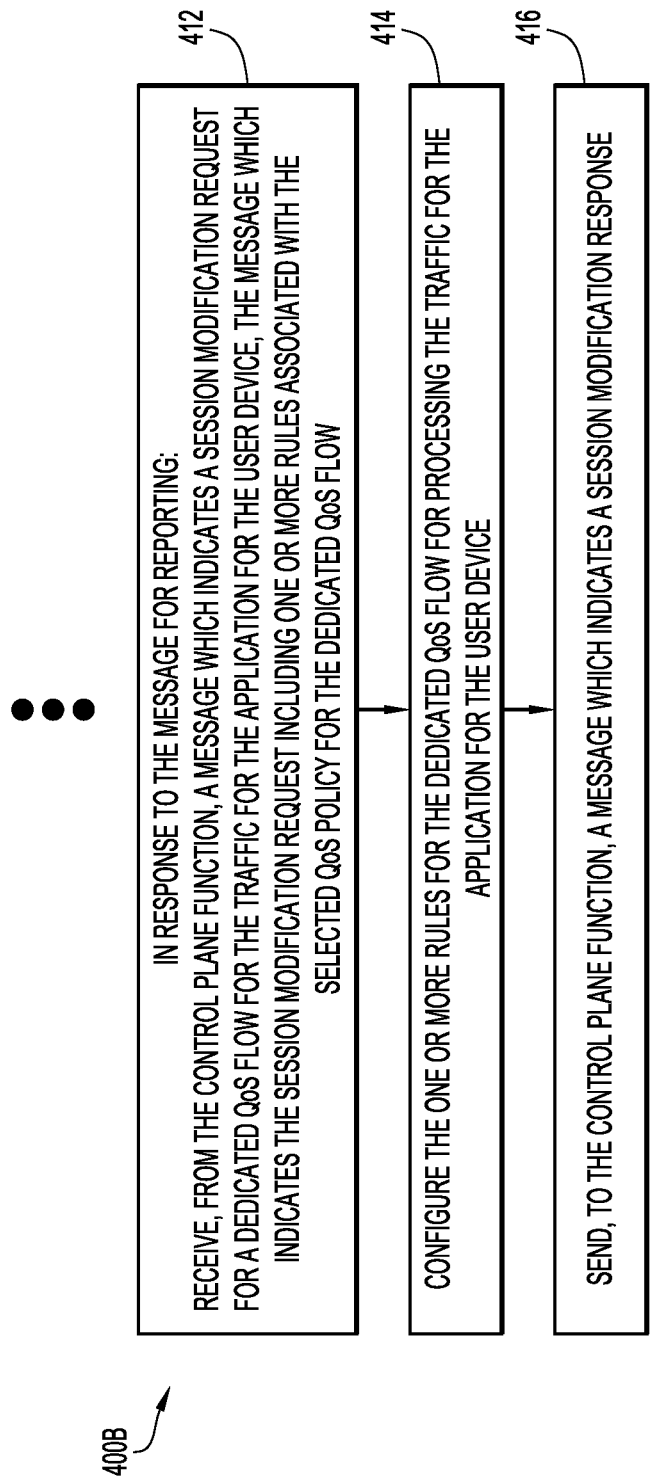

FIGS. 4A-4B are flowcharts 400A, 400B for describing a method of QoS policy selection and QoS flow creation based on DNS application metadata in a mobile network according to some implementations of the present disclosure, which may be performed at a user plane function or UPF. The method of FIGS. 4A-4B may be performed by a computing device or a network node configured to connect in a network for communication, to operate as a UPF. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the user plane function, UPF, or other function.

Beginning with the flowchart 400A of FIG. 4A, the user plane function may receive, from a user device, a DNS query for an application for the user device (step 402 of FIG. 4A). In response to receiving the DNS query, the user plane function may send, to a DNS server, one or more corresponding DNS queries based on the DNS query (step 404 of FIG. 4A). In response to sending the one or more corresponding DNS queries, the user plane function may receive, from the DNS server, one or more DNS query responses in response to sending the one or more corresponding DNS queries (step 406 of FIG. 4A). The one or more DNS query responses may include an IP address as well as metadata associated with the application. The metadata may include at least an application identifier associated with the application. The user plane function may send to the user device the DNS query response which includes the IP address. In some implementations of steps 404 and 406, where the DNS server is part of a secure internet gateway of a cloud infrastructure, communications with and via the secure internet gateway may be performed over a secure encrypted channel, such as an IPsec or TLS tunnel. In response, the user plane function may send, to a control plane function (e.g. an SMF), a message for reporting (e.g. usage reporting) which includes the application identifier associated with the application (step 408 of FIG. 4A).

As indicated in FIG. 4A, the message for reporting may be utilized as a trigger for the creation of a dedicated QoS Flow for traffic for the application for the user device. Thus, in response to the message for reporting, a dedicated QoS Flow may be created for traffic for the application for the user device via the user plane function. This dedicated QoS Flow may be created according to a selected QoS policy associated with the application identifier. Here, the control plane function may perform the steps to create or coordinate the creation of the dedicated QoS Flow.

In some other implementations, the control plane function may perform the selection of the QoS policy by consulting a stored mapping between a plurality of application identifiers and a plurality of QoS policies. Here, the control plane function may select, according to the stored mapping, one of the plurality of QoS policies corresponding to the application identifier.

In other implementations, the user plane function may send, to the control plane function (e.g. the SMF), a message for reporting which additionally or alternatively includes one or more QoS parameters or indicators associated with a QoS policy associated with the application. Here, the user plane function may receive one or more DNS query responses which include metadata associated with the application which additionally or alternatively include the one or more QoS parameters or indicators of the (previously-determined or configured) QoS policy for the application. In this case, the control plane function may create the dedicated QoS Flow according to a selected QoS policy associated with the one or more QoS parameters or indicators received from the user plane function in the reporting.

Continuing with the flowchart 400B of FIG. 4B, the user plane function may receive, from the control plane function (e.g. the SMF), a message which indicates a session modification request for the dedicated QoS Flow for the traffic for the application for the user device (step 412 of FIG. 4B). The message which indicates the session modification request may include one or more rules associated with the selected QoS policy for the dedicated QoS Flow. The user plane function may configure the one or more rules for the dedicated QoS Flow for processing the traffic for the application for the user device (step 414 of FIG. 4B). The user plane function may send, to the control plane function, a message which indicates a session modification response (step 416 of FIG. 4B).

Application metadata may be obtained based on steps 404 and 406 of FIG. 4A with use of one of the methods described in relation to FIGS. 4C-4D. Accordingly, FIGS. 4C-4D are flowcharts 400C, 400D for describing methods of obtaining DNS application metadata for use in the method of FIGS. 4A-4B. Again, in some implementations where the DNS server is part of the secure internet gateway of the cloud infrastructure, communications with and via the secure internet gateway may be performed over a secure encrypted channel, such as an IPsec or TLS tunnel.

In some implementations, with reference to the flowchart 400C of FIG. 4C, the user plane function may interact with a DNS server which implements EDNS. Here, the DNS server with the EDNS mechanism may maintain associations between a plurality of URLs and the plurality of application IDs/names. Initially, the user plane function may receive, from a user device, a DNS query for an application for the user device. In response, the user plane function may send, to the DNS server, a corresponding DNS query based on the DNS query (step 418 of FIG. 4C). The user plane function may receive, from the DNS server, a DNS query response which includes an IP address, as well as an EDNS extension which includes the application ID associated with the application (step 420 of FIG. 4C). The user plane function may then send, to the control plane function (e.g. the SMF), the message for (usage) reporting which includes the application identifier associated with the application, so that the control plane function may perform the selection of the QoS policy by consulting the stored mapping between the application IDs and the QoS policies.

In other implementations, with reference to the flowchart 400D of FIG. 4D, the user plane function may interact with a DNS server which may be or include a DNS-AS mechanism. Here, the DNS server with the DNS-AS mechanism may maintain associations between a plurality of URLs and the plurality of application IDs/names and/or QoS parameters. Initially, the user plane function may receive, from a user device, a DNS query for an application for the user device. The user plane function may send, to the DNS server, a first corresponding DNS query based on the DNS query (step 422 of FIG. 4D). In response, the user plane function may receive, from the DNS server, a first query response which includes the IP address (step 424 of FIG. 4D). Then, the user plane function may send, to the DNS server, a second corresponding DNS query (e.g. a DNS-AS query) which indicates a request for metadata associated with the application (step 426 of FIG. 4D). In response, the user plane function may receive, from the DNS server, a second query response which includes the metadata associated with the application, where the metadata includes at least the application identifier associated with the application (step 428 of FIG. 4D). In some implementations of FIG. 4D, the user plane function may then send, to the control plane function (e.g. the SMF), the message for (usage) reporting which includes the application ID associated with the application, so that the control plane function may perform the selection of the QoS policy based on the application identifier by consulting the stored mapping between the application identifiers and the QoS policies.

In alternative implementations of FIG. 4D, the user plane function may receive in step 428 metadata which additionally or alternatively includes one or more QoS parameters or indicators of a (previously-determined) QoS policy for the application. For 5G, the one or more QoS parameters or indicators may include one or more of a 5QI, a Resource Type, a Packet Error Rate, a Packet Delay Budget, a Default Priority Level, a Default Maximum Data Burst Volume, and/or a Default Averaging Window. Once received, the user plane function may send, to the control plane function (e.g. the SMF), the message for reporting which additionally or alternatively includes the one or more QoS parameters or indicators associated with the QoS policy for the application. In this case, the control plane function may create the dedicated QoS Flow according to a selected QoS policy associated with the one or more QoS parameters or indicators received from the user plane function in its reporting. In these alternative implementations, the control plane function need not consult any stored mapping between application identifiers and QoS policies.

In other implementations described later in relation to FIGS. 7-11, applicable to IEEE 802.11 or wireless LANs/WLANs, application metadata which includes one or more QoS parameters or indicators for Wi-Fi (e.g. a UP value and/or DSCP value) may be obtained with use of one of the methods described above in relation to FIGS. 4C-4D. In some of these implementations, a corresponding DNS query may include an indicator for RAT type (e.g. an indicator for 5G or Wi-Fi) for obtaining the appropriate RAT-specific QoS parameters or indicators.

FIG. 5 is a flowchart 500 for describing a method of QoS policy selection and QoS flow creation based on DNS application metadata in a mobile network according to some implementations of the present disclosure. The method of FIG. 5 may be performed by a computing device or a network node configured to connect in a network for communication, to operate as a control plane function (e.g. SMF). The method of FIG. 5 which may be performed by the control plane function may be a corresponding method to the method of FIGS. 4A-4B which may be performed by the user plane function. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the control plane function, SMF, or other function.

In the flowchart 500 of FIG. 5, the control plane function may maintain access to a stored mapping between a plurality of application IDs and a plurality of QoS policies (step 502 of FIG. 5). In the stored mapping, each QoS policy of the plurality of QoS policies may be associated with a respective one of a plurality of 5QIs. In an example implementation, the control plane function maintains storage of the stored mapping in memory.

As described earlier above, a message for reporting may be utilized as a trigger for creating a dedicated QoS Flow for traffic for an application for a user device. Thus, in response to receiving a message for reporting from a user plane function, the control plane function may initiate creation of a dedicated QoS Flow for traffic for an application for a user device. The dedicated QoS Flow may be created according to a selected QoS policy associated with an application ID received from the user plane function.

In particular, in response to receiving the message, the control plane function may select, according to the stored mapping, one of the plurality of QoS policies corresponding to the application ID (step 504 of FIG. 5). The control plane function may send one or more radio-side messages for creating the dedicated QoS Flow in the mobile network according to the selected QoS policy (step 506 of FIG. 5). The control plane function may send, to the user plane function, a message which indicates a session modification request for configuring one or more rules of the selected QoS policy at the user plane function for the dedicated QoS Flow for the traffic for the application for the user device (step 508 of FIG. 5). The control plane function may receive, from the user plane function, a message which indicates a session modification response (step 510 of FIG. 5).

Figure 6A:
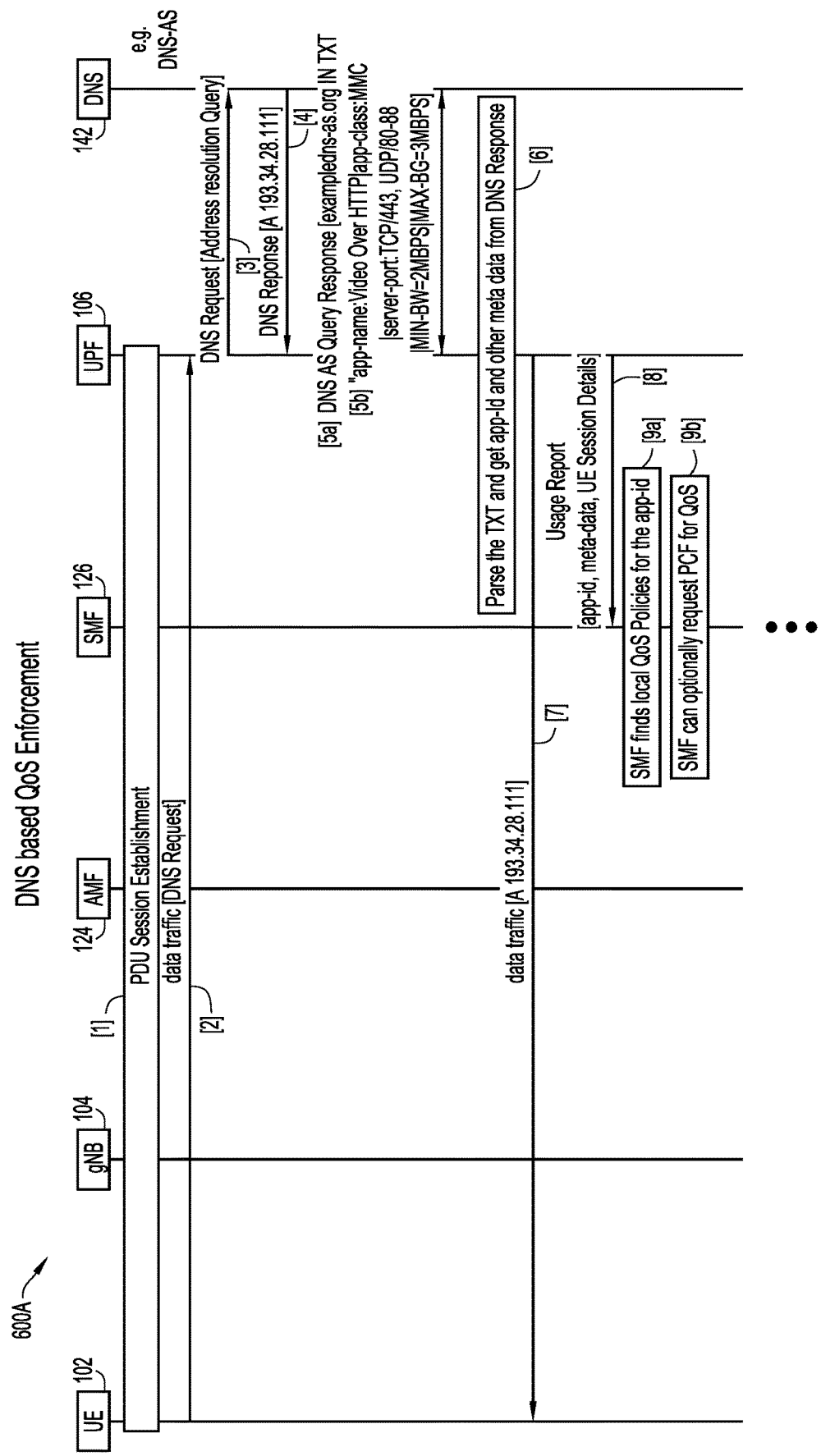
FIGS. 6A-6B form a call flow diagram for describing a call flow for QoS policy selection and QoS flow creation based on DNS application metadata in a mobile network according to some implementations of the present disclosure.
Figure 6B:
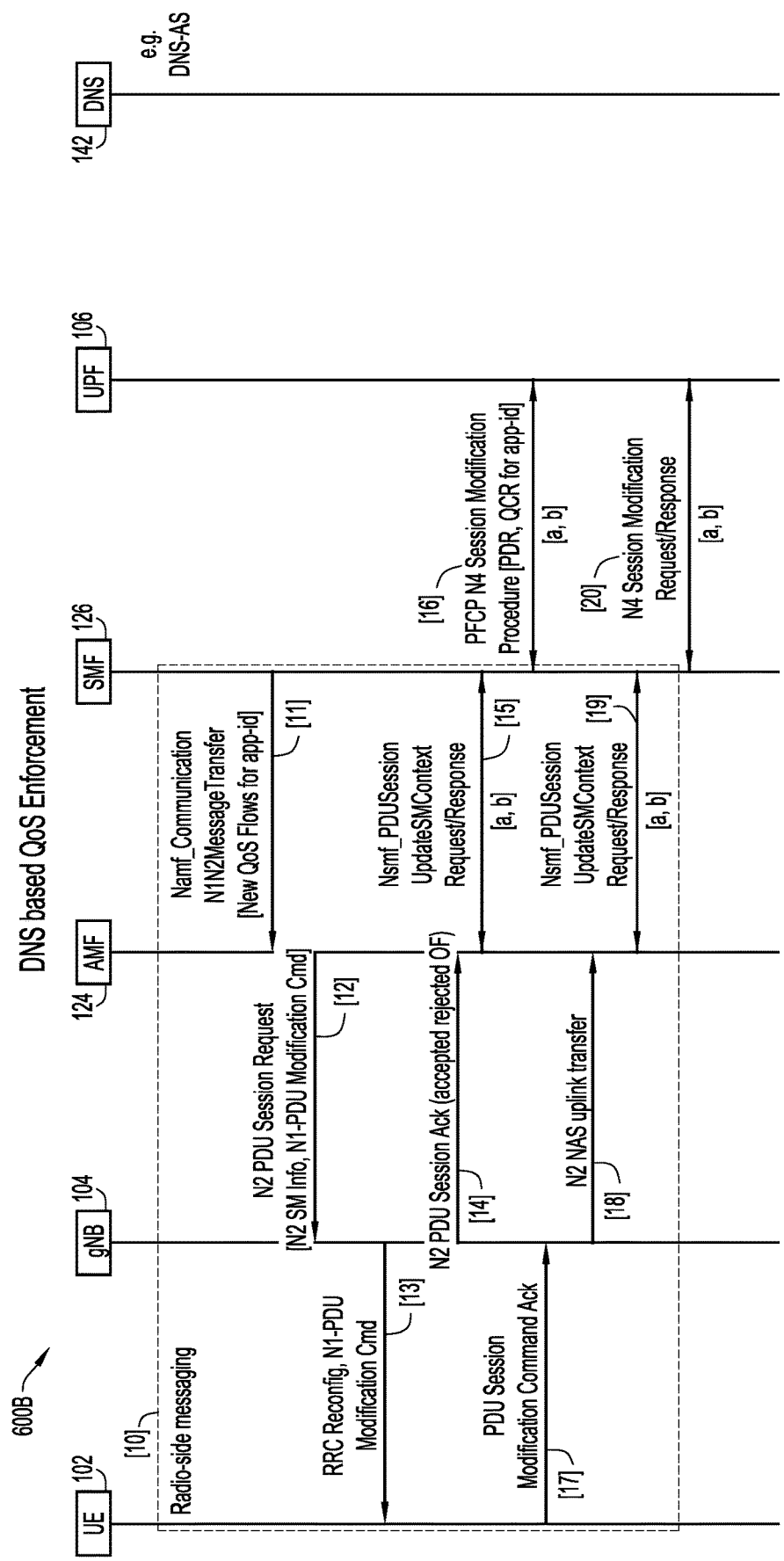

FIGS. 6A-6B form a call flow diagram 600A/600B for describing a call flow for QoS policy selection and QoS flow creation based on DNS application metadata in a mobile network according to some implementations of the present disclosure. The call flow of FIGS. 6A-6B accords to the methods described in relation to the flowcharts of FIGS. 4A-4D and 5.

In the call flow diagram 600A of FIG. 6A, UE 102 may establish a PDU session in the mobile network (step 1 of FIG. 6A). Here, an application may be invoked at UE 102. In response, UE 102 may send data traffic which includes a DNS request associated with the application (step 2 of FIG. 6A). UPF 106 will communicate with DNS server 142 to serve the request. In some implementations, where DNS server 142 is part of the secure internet gateway of the cloud infrastructure, communications with and via the secure internet gateway may be performed over a secure encrypted channel, such as an IPsec or TLS tunnel. Accordingly, UPF 106 may receive from UE 102 the DNS request associated with the application, and send to DNS server 142 a corresponding DNS query which is based on the DNS query (step 3 of FIG. 6A). This corresponding DNS request may be an address resolution query. In response, UPF 106 may receive from the DNS server 142 a DNS query response which includes an IP address (step 4 of FIG. 6A). UPF 106 may then send to DNS server 142 a subsequent corresponding DNS query for metadata associated with the application (e.g. a DNS-AS query) (step 5a of FIG. 6A). In response, UPF 106 may receive from the DNS server 142 a subsequent DNS query response which includes the metadata associated with the application (step 5b of FIG. 6A). The metadata may include at least an application ID associated with the application.

In some implementations, UPF 106 may receive, in the DNS-AS query response of step 5b, metadata associated with the application which additionally or alternatively includes one or more QoS parameters or indicators of a (previously-determined or configured) QoS policy for the application. The metadata may be received in the form of TXT records. Thus, the metadata may include an application ID and one or more QoS parameters or indicators which may include, for example, type, 5QI, Resource Type, Packet Error Rate, Packet Delay Budget, a Default Priority Level, a Default Maximum Data Burst Volume, a Default Averaging Window, and/or other relevant information. UPF 106 may receive the TXT records and parse the metadata to identify the application identifier and the other metadata (step 6 of FIG. 6A). As shown in the example of FIG. 6A, the DNS-AS query response is indicated as DNS-AS query response [example.dns-as.org IN TXT "app-name: Video Over HTTP app-class: MMC server-port: TCP/443, UDP/80-88|MIN-BW=2MBPS|MAX-BG=3MBPS)].

UPF 106 may send to UE 102 a DNS query response which includes the IP address (step 7 of FIG. 6A). Triggered by receipt of the DNS response(s), UPF 106 may send to SMF 126 a message for reporting (e.g. usage reporting) which includes the application ID associated with the application (step 8 of FIG. 6A). The message for usage reporting may be utilized as a trigger for the creation of a dedicated QoS Flow for traffic for the application for UE 102. For creating the dedicated QoS Flow, SMF 126 may select one of a plurality of QoS policies based on the application identifier (step 9a of FIG. 6A). The selected QoS policy may be associated with one of a plurality of different 5QIs. In some implementations, SMF 126 may select the QoS policy based on the application identifier by consulting the stored mapping between application identifiers and QoS policies. In other (optional) implementations where a PCF is utilized in the network, SMF 126 may request and receive the QoS policy data from the PCF (step 9b of FIG. 6A). In even other implementations, EDNS may be utilized instead of the DNS-AS mechanism.

Continuing with the call flow diagram 600B of FIG. 6B, SMF 126 may send one or more radio-side messages for creating the dedicated QoS Flow, extending to UE 102 via a base station (e.g. gNB 104) and to UPF 106 (step 10 of FIG. 6B). The one or more messages may include a Service Data Flow (SDF) filter for UE 102, which may be generated based on flow metadata (e.g. n-tuple flow metadata) and the application identifier. Radio-side messaging for QoS Flow creation is now generally described. SMF 126 may initiate a Namf_Communication_N1N2Message Transfer towards AMF 124 (step 11 of FIG. 6B). The message transfer may include a PDU Session Modification Command, and for example, the QFI and QoS profile for the new dedicated QoS Flow. AMF 124 may send to SMF 126 an acknowledgement data notification (not shown in FIG. 6B). AMF 124 may then send an N2 PDU Session Request message to gNB 104 (step 12 of FIG. 6B). This message may include an N1 Session Management (SM) container which carries the PDU Session Modification Command. The gNB 104 may issue a signaling exchange with UE 102 that is related with the information received from SMF 126. Here, an RRC Connection Reconfiguration may take place with UE 102 (e.g. transporting the N1 SM container to UE 102) for modifying resources related to the PDU session (step 13 of FIG. 6B). The gNB 104 may acknowledge the N2 PDU Session Request by sending an N2 PDU Session Ack message to AMF 124 (step 14 of FIG. 6B). AMF 124 may forward the N2 SM information to SMF 126 via an Nsmf_PDUSession_UpdateSMContext service operation (step 15a of FIG. 6B). SMF 126 may reply with an Nsmf_PDUSession_UpdateSMContext Response (step 15b of FIG. 6B).

With respect to UPF 106, SMF 126 may update the N4 session of UPF 106 by sending an N4 Session Modification Request (step 16a of FIG. 6B). This may be for configuring one or more rules of the selected QoS policy at UPF 106 for the dedicated QoS Flow. For example, SMF 126 may update UPF 106 with one or more UL PDRs for the new dedicated QoS Flow. This may allow UL packets with the QFI of the new QoS Flow to be communicated. UPF 106 may reply with an N4 Session Modification Response (step 16b of FIG. 6B).

Continuing with the radio-side messaging after steps 15a-15b of FIG. 6B, UE 102 may acknowledge the PDU Session Modification Command from step "c" by sending a NAS message to gNB 104 (step 17 of FIG. 6B), which forwards the NAS message to AMF 124 (step 18 of FIG. 6B). AMF 124 forwards the N1 SM container (e.g. including the PDU Session Modification Command Ack) to SMF 126 via an Nsmf_PDUSession_UpdateSMContext service operation (step 19a of FIG. 6B). SMF 126 may reply with a Nsmf_PDUSession_UpdateSMContext Response (step 19b of FIG. 6B).

Again with respect to UPF 106, SMF 126 may again update the N4 session of UPF 106 by sending an N4 Session Modification Request (step 20a of FIG. 6B). UPF 106 may reply with an N4 Session Modification Response (step 20b of FIG. 6B).

According to alternative implementations of the present disclosure, the techniques and mechanisms for QoS policy selection and QoS flow creation based on DNS application metadata may be applied in an enterprise private network which is or includes a wireless LAN or WLAN operative in accordance with IEEE 802.11. Such alternative implementations are now be described in relation to FIGS. 7-11 (which may be based on the network configuration of FIGS. 1A-1B, 2A-2B, and 3A-3C).

Figure 7:
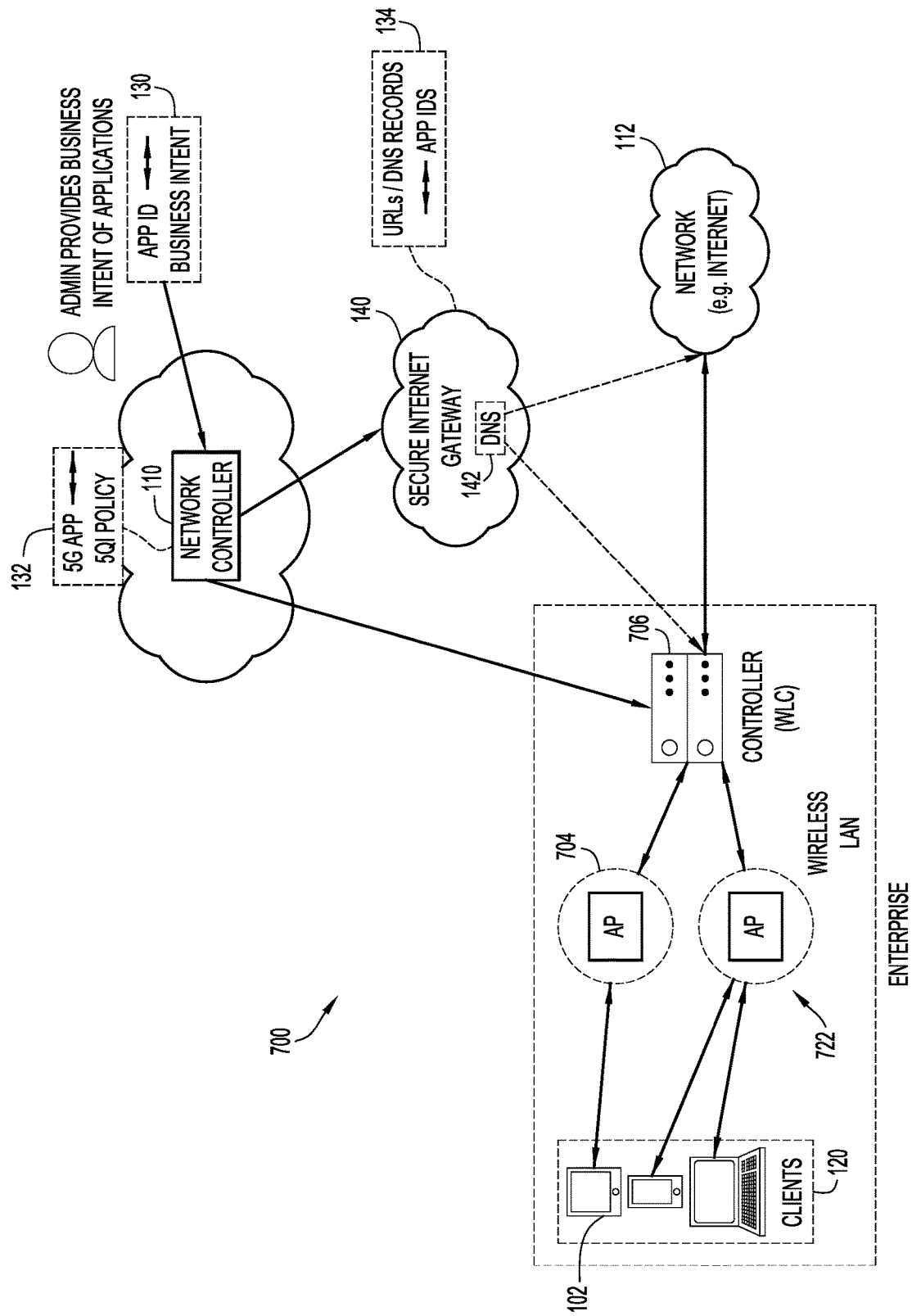
FIG. 7 is an illustrative representation of a basic network architecture of an enterprise private network which includes a wireless network, and more particularly, a wireless local area network (LAN) which includes a controller (e.g. a wireless LAN controller "WLC") and one or more access points (APs)

With reference now to FIG. 7, an illustrative representation of a basic network architecture 700 of an enterprise private network for an enterprise which includes a wireless network, and more particularly, a wireless LAN or WLAN is shown. For ease in explanation, the enterprise private network of FIG. 7 is illustrated generally in the same or similar as the enterprise private network of FIG. 1A, but with use of a plurality of wireless access points (APs) 722 (e.g. an AP 704) in place of the plurality of base stations, and a controller which may be a wireless LAN controller (WLC) 706 in place of the user and control plane functions (i.e. the UPF and SMF). In some implementations, a Control and Provisioning of Wireless Access Points (CAPWAP) protocol/tunnel may be utilized for communication between WLC and AP 704.

Figure 8:
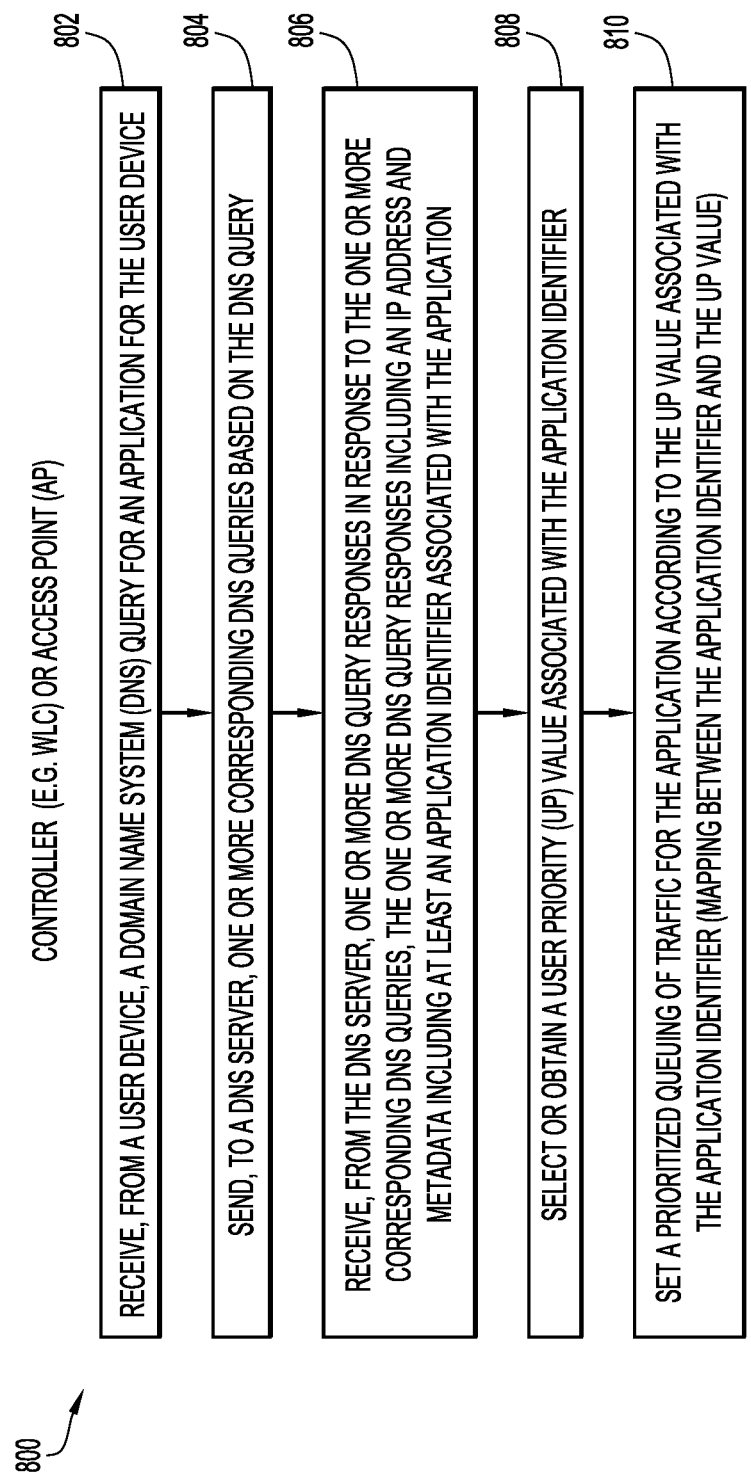
FIG. 8 is a flowchart for describing a method of QoS policy selection and QoS flow creation based on DNS application metadata in a wireless network according to some implementations of the present disclosure, which may be performed at a controller (e.g. WLC) or an AP of a wireless LAN.

FIG. 8 is a flowchart 800 for describing a method of QoS policy selection and QoS flow creation based on DNS application metadata in a wireless LAN or WLAN according to some implementations of the present disclosure. In some implementations, the method of FIG. 8 may be performed at a controller (e.g. WLC) which is configured in the user plane path (e.g. with the AP) (see e.g. FIG. 7). In other implementations, the method of FIG. 8 may be performed at an access point where the controller (e.g. WLC) is not in the user plane path (e.g. where the WLC may communicate with or control the AP in a manner similar to SMF control of a UPF). More generally, the method of FIG. 8 may be performed by a computing device or a network node configured to connect in a network for communication, to operate as a controller (e.g. WLC) or access point. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the controller (e.g. WLC) or access point.

Beginning with the flowchart 800 of FIG. 8, the controller or access point may receive, from a user device, a DNS query for an application for the user device (step 802 of FIG. 8). The controller or access point may communicate with a DNS server to serve the request. In some implementations, where the DNS server is part of a secure internet gateway of a cloud infrastructure, communications with and via the secure internet gateway may be performed over a secure encrypted channel, such as an IPsec or TLS tunnel. In response to receiving the DNS query, the controller or access point may send, to the DNS server, one or more corresponding DNS queries based on the DNS query (step 804 of FIG. 8). In response to sending the one or more corresponding DNS queries, the controller or access point may receive, from the DNS server, one or more DNS query responses in response to sending the one or more corresponding DNS queries (step 806 of FIG. 8). The one or more DNS query responses may include an IP address as well as metadata associated with the application. The metadata may include at least an application ID associated with the application. The controller or access point may send to the user device the DNS query response which includes the IP address.

The controller or access point may select or obtain a User Priority (UP) value associated with the application ID (step 808 of FIG. 8). In some implementations, the controller or access point may select a UP value by consulting a stored mapping between a plurality of application IDs and a plurality of UP values. Here, the controller or access point may select, according to the stored mapping, one of the plurality of UP values corresponding to the application identifier. In other implementations, for obtaining the selected UP value, the controller or access point may receive one or more DNS query responses which include metadata which includes the application ID as well as the selected UP value for the application. The controller or access point may then set, in the access point, a prioritized queuing of traffic for the application according to the UP value associated with the application identifier (step 810 of FIG. 8). If the controller is performing the method, for step 810, the controller may send, to the access point, one or more messages for setting the prioritized queuing of traffic for the application according to the UP value associated with the application identifier. The access point may then operate to receive and classify traffic (e.g. DSCP-marked traffic) for the application into an appropriate queue for proper QoS treatment. In any or all of the above steps, the DSCP value may be provided along with the UP value.

In some implementations of FIG. 8, the controller or access point may interact with a DNS server which implements EDNS for carrying out the DNS interactions of steps 804 and 806. This procedure may be considered to be similar or the same as that procedure described earlier above in relation to FIG. 4C. In an example embodiment, the controller or access point may receive, from a user device, a DNS query for an application for the user device. In response, the controller or access point may send, to the DNS server, a corresponding DNS query based on the DNS query. The controller or access point may receive, from the DNS server, a DNS query response which includes an IP address and an EDNS extension which includes the application ID associated with the application. The controller or access point may then select the UP value by consulting the stored mapping between the application identifiers and the UP values. The DSCP value may be provided along with the UP value.

In other implementations of FIG. 8, the controller or access point may interact with a DNS server which implements DNS-AS for carrying out the DNS interactions of steps 804 and 806. This procedure may be considered to be similar or the same as that procedure described earlier above in relation to FIG. 4D. In an example embodiment, the controller or access point may receive, from a user device, a DNS query for an application for the user device. The controller or access point may send, to the DNS server, a first corresponding DNS query based on the DNS query. In response, the controller or access point may receive, from the DNS server, a first query response which includes the IP address. Then, the controller or access point may send, to the DNS server, a second corresponding DNS query (e.g. a DNS-AS query) which indicates a request for metadata associated with the application. In response, the controller or access point may receive, from the DNS server, a second query response which includes the metadata associated with the application, where the metadata includes at least the application ID associated with the application. The controller or access point may select the appropriate UP value by consulting the stored mapping between the application IDs and the UP values. In other implementations, the metadata may further include the UP value associated with the application ID. In above steps, the DSCP value may be provided along with the UP value.

Figure 9:
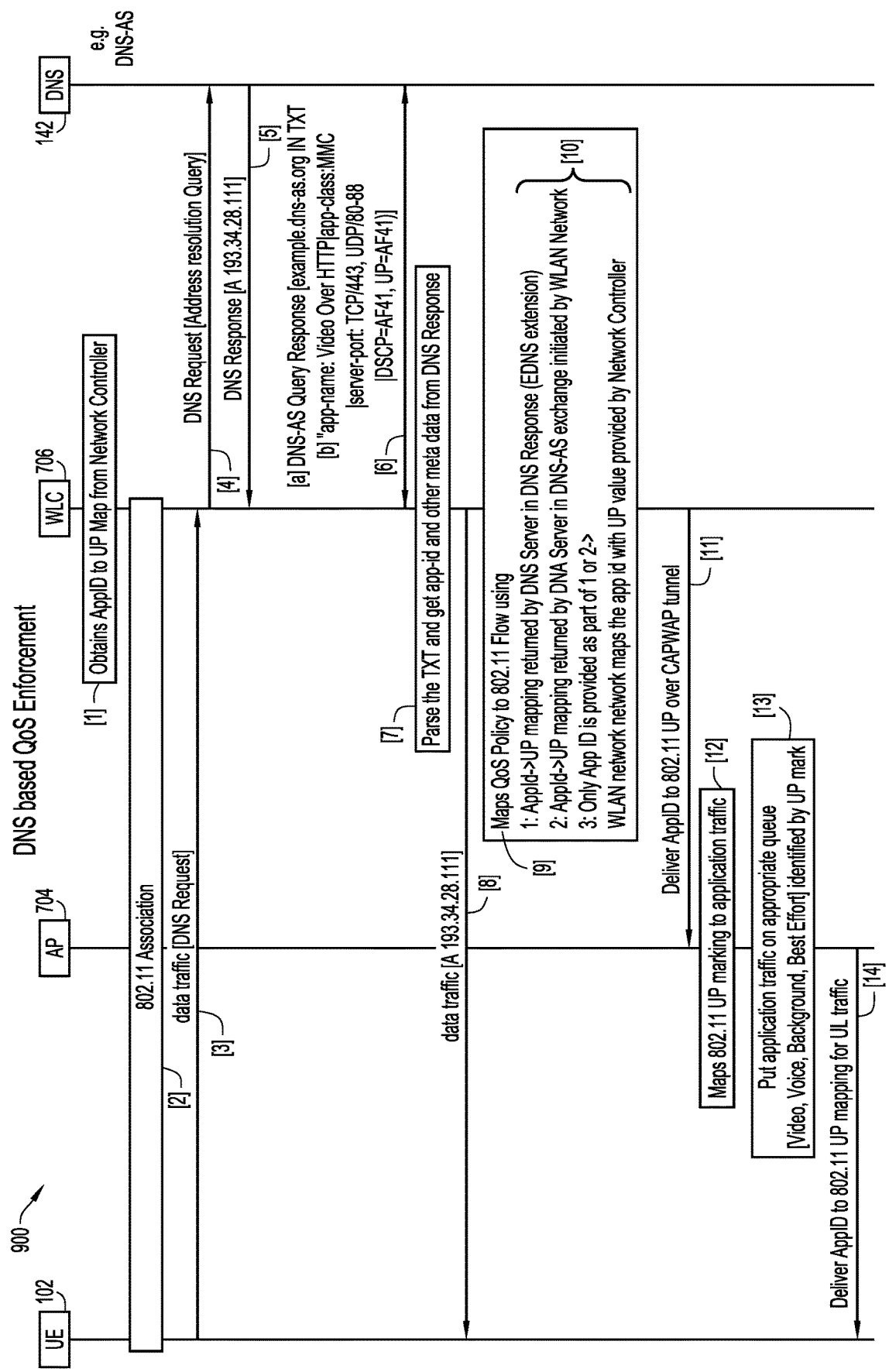
FIG. 9 is a call flow diagram for describing a call flow for QoS policy selection and QoS flow creation based on DNS application metadata in a wireless network, according to some implementations of the present disclosure.

FIG. 9 is a call flow diagram 900 for describing a call flow for QoS policy selection and QoS flow creation based on DNS application metadata in a wireless LAN or WLAN according to some implementations of the present disclosure. The call flow of FIG. 9 is in accord with the method described in relation to the flowchart of FIG. 8. In this call flow, the controller or WLC is configured in the user plane path for performing processing steps according to some implementations.

In some implementations, WLC 706 of the WLAN (e.g. operative in accordance with IEEE 802.11) may obtain from the network controller a mapping of application IDs of applications and UP values (step 1 of FIG. 9). WLC 706 may maintain access to it as a stored mapping between the application IDs and the UP values. During its operation, UE 102 may associate with the WLAN (step 2 of FIG. 9). An application may be invoked or in use at UE 102. UE 102 may send data traffic which includes a DNS request associated with the application (step 3 of FIG. 9). WLC 706 may communicate with DNS server 142 to serve the request. In some implementations, where DNS server 142 is part of a secure internet gateway of a cloud infrastructure, communications with and via the secure internet gateway may be performed over a secure encrypted channel, such as an IPsec or TLS tunnel. WLC 706 may receive from UE 102 the DNS request associated with the application, and send to DNS server 142 a corresponding DNS query which is based on the DNS query (step 4 of FIG. 9). This corresponding DNS request may be an address resolution query. In response, WLC 706 may receive from the DNS server 142 a DNS query response which includes an IP address (step 5 of FIG. 9). WLC 706 may then send to DNS server 142 a subsequent corresponding DNS query for metadata associated with the application (e.g. a DNS-AS query) (step 6a of FIG. 9). In response, WLC 706 may receive from the DNS server 142 a subsequent DNS query response which includes the metadata associated with the application (step 6b of FIG. 9). The metadata may include at least an application ID associated with the application.

In some implementations, WLC 706 may receive, in the DNS-AS query response of step 6b, metadata associated with the application which additionally or alternatively includes the UP value for the application. The DSCP value may be provided along with the UP value. The metadata may be received in the form of TXT records. WLC 706 may receive the TXT records and parse the metadata to identify the application ID and the other metadata (step 7 of FIG. 9). As shown in the example of FIG. 9, the DNS-AS query response is indicated as DNS-AS query response [example.dns-as.org IN TXT "app-name: Video Over HTTP app-class: MMC|server-port: TCP/443, UDP/80-88|DSCP=AF41, UP=AF41)].

WLC 706 may send to UE 102 a DNS query response which includes the IP address (step 8 of FIG. 9). WLC 706 may map the appropriate QoS policy to the IEEE 802.11 flow for the traffic for the application for the user device (step 9 of FIG. 9). Here, WLC 705 may select or obtain a UP value associated with the application ID (step 10 of FIG. 9). In some implementations, WLC 706 may select a UP value by consulting the stored mapping between the application IDs and the UP values. Here, WLC 706 may select, according to the stored mapping, one of the plurality of UP values corresponding to the application ID. In some implementations, the application ID may be obtained from DNS server 142 using EDNS or the DNS-AS mechanism. In other implementations, for obtaining the UP value, WLC 706 may utilize DNS-AS for obtaining metadata which includes the application ID and the selected UP value for the application. Again, in above steps, the DSCP value may be provided along with the UP value.

WLC 706 may then send, to AP 704, one or more messages for setting a prioritized queuing of traffic for the application according to the UP value associated with the application ID (step 11 of FIG. 9). These one or more messages may be sent over the CAPWAP tunnel. The one or more messages to AP 704 may include a mapping between the application ID and the UP value. Here, AP 704 may set the prioritized queuing to classify traffic (e.g. DSCP-marked traffic) for the application into an appropriate queue for proper QoS treatment ("Background," "Best Effort," "Video," and "Voice") (steps 12 and 13 of FIG. 9). In turn, AP 704 may send, to UE 102, one or more messages for setting a prioritizing queuing of traffic for the application and for marking the traffic (step 14 of FIG. 9). The one or more messages to UE 102 may include a mapping between the application ID and the UP value. Again, in above steps, the DSCP value may be provided along with the UP value. See FIGS. 10 and 11. As is apparent, receipt of the DNS query response(s) (step 5 or 6) may be utilized as a trigger for setting the appropriate QoS policy to the flow.

Figure 10:
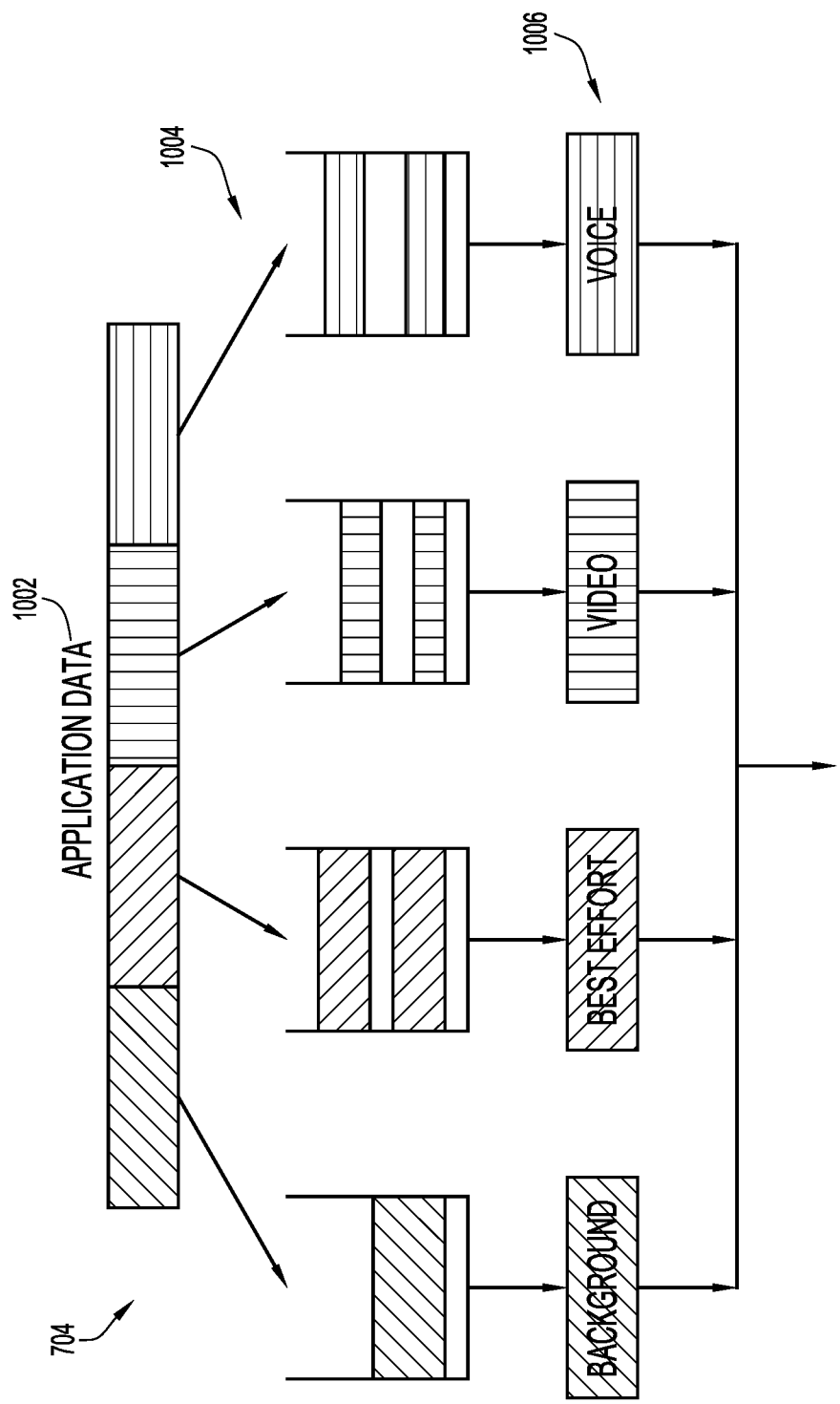
FIG. 10 is an illustrative representation of a plurality of queues of an access point (AP) of a wireless network for different QoS treatment for various types of incoming traffic associated with different applications.

FIG. 10 is an illustrative representation of a plurality of queues 1004 of AP 704 for different QoS treatment associated with various types of incoming traffic for different applications. The incoming traffic which is composed of various application data 1002 associated with the different applications may be received and classified (e.g. based on application ID/DSCP marking) into one of the queues 1004 of AP 704 for proper QoS treatment. Each one of the queues 1004 for processing is associated with one of a plurality of categories 1006. The plurality of categories 1006 may be informative categories or Wi-Fi Multimedia (WMM) categories. As indicated, the plurality of categories 1006 may include categories for "Background," "Best Effort," "Video," and "Voice" traffic.

FIG. 11 is a table 1100 for illustrating a mapping between UP values and access categories of different applications for different QoS treatment. The UP values may be referred to as UP QoS values. The UP values are indicated in the table 1100 from lowest to highest. As shown, each UP value is associated with a designation, an access category, and/or an informative category ("Background," "Best Effort," "Video," and "Voice").

In some preferred implementations, the enterprise private network includes both private 5G access and IEEE 802.11 access (with separate or integrated core functionality) for policy selection and QoS flow creation according to both procedures described herein (e.g. for 5G, FIGS. 4A-4B, 4C-4D, 5, and 6A-6B; for IEEE 802.11, FIGS. 8-11 including 4C-4D).

Advantageously, despite the growing base of applications that utilize end-to-end encryption, policy selection and QoS flow creation for traffic associated with these applications may be easily and efficiently performed. Use of DPI on application traffic for these purposes would require relatively high computational processing and may be avoided using techniques and mechanisms of the present disclosure.

Figure 12:
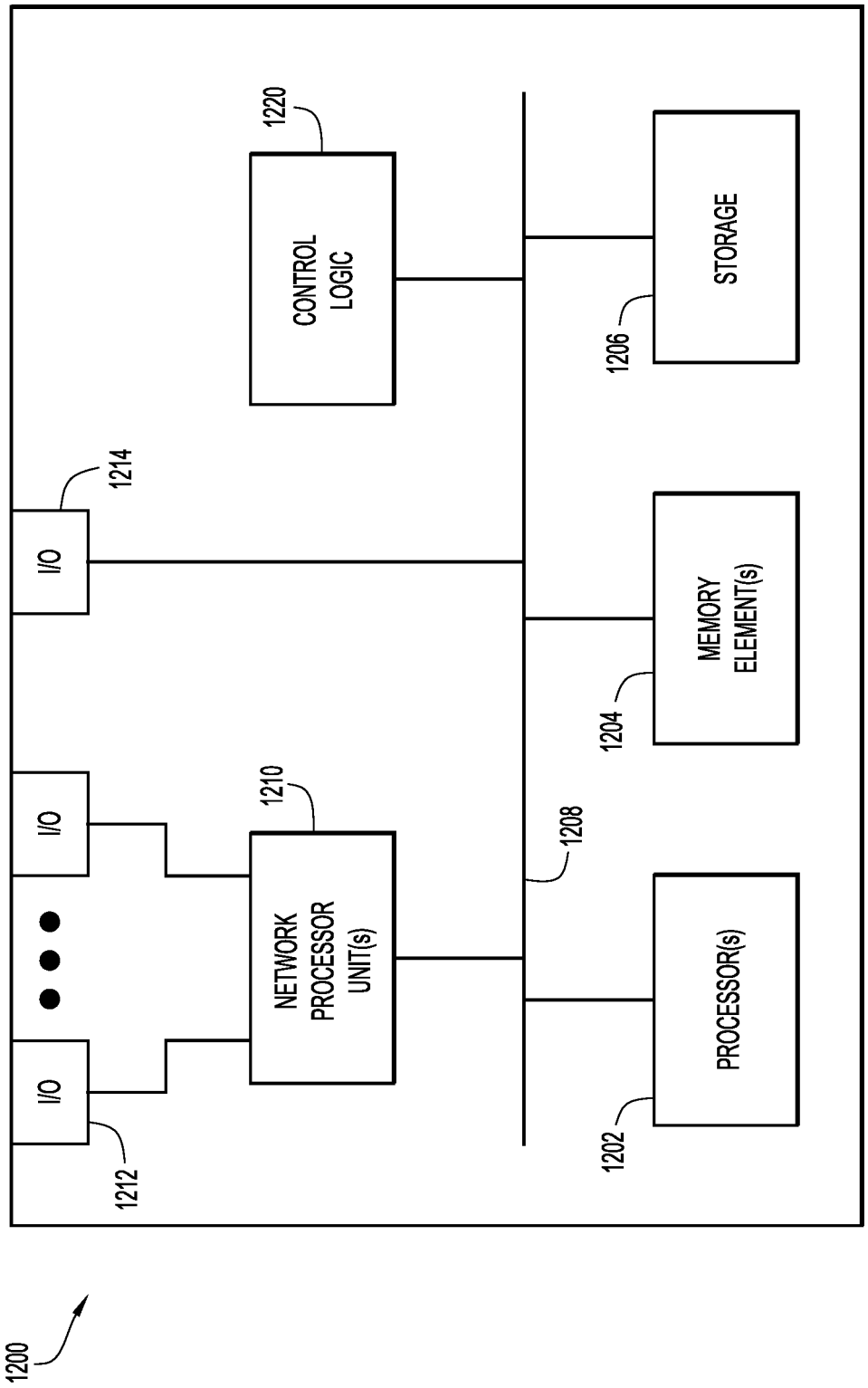
FIG. 12 illustrates a hardware block diagram of a computing device that may perform functions associated with operations discussed herein (e.g. for the control plane function or the controller).

FIG. 12 illustrates a hardware block diagram of a computing device 1200 that may perform functions associated with operations discussed herein in connection with the techniques described in relation to the above figures, especially in relation to the control plane function(s) or the controller (e.g. SMF or WLC). In various embodiments, a computing device, such as computing device 1200 or any combination of computing devices 1200, may be configured as any entity/entities as discussed for the techniques depicted in connection with the figures in order to perform operations of the various techniques discussed herein.

In at least one embodiment, the computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, and/or any other I/O port(s) now known or hereafter developed. Thus, the network processor unit(s) 1210 and/or network I/O interface(s) 1212 may include suitable interfaces for receiving, transmitting, and/or otherwise communicating data and/or information in a network environment.

interface(s) 1214 allow for input and output of data and/or information with other entities that may be connected to computer device 1200. For example, I/O interface(s) 1214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Techniques and mechanisms for QoS policy selection and QoS flow creation based on DNS application metadata in a mobile or wireless network (e.g. of a private enterprise) have been described herein.

In one illustrative example, a method of a user plane function configured for use in a private 5G network of an enterprise may involve receiving, from a user device, a DNS query for an application for the user device; sending, to a DNS server, one or more corresponding DNS queries based on the DNS query; receiving, from the DNS server, one or more DNS query responses in response to the one or more corresponding DNS queries, where the one or more DNS query responses include an IP address and metadata including an application identifier associated with the application; and sending, to a control plane function, a message for reporting which includes the application identifier associated with the application. In response to the message for reporting, a dedicated QoS Flow may be created for traffic for the application for the user device via the user plane function according to a selected QoS policy associated with the application identifier. The selected QoS policy may comprise a selected one of a plurality of QoS policies, each QoS policy of the plurality of QoS policies being associated with a respective one of a plurality of 5QIs. The metadata may further comprise at least one of 5QI, a Resource Type, a Packet Error Rate, a Packet Delay Budget, a Default Priority Level, a Default Maximum Data Burst Volume, and a Default Averaging Window. The method may further involve receiving, from the control plane function, a message which indicates a session modification request for creating the dedicated QoS Flow for the traffic for the application for the user device, the message which indicates the session modification request including one or more rules associated with the selected QoS policy for the dedicated QoS Flow; configuring the one or more rules for the dedicated QoS Flow for processing the traffic for the application for the user device; and sending, to the control plane function, a message which indicates a session modification response.

In some implementations, the DNS server is configured with EDNS, and sending the one or more corresponding DNS queries and receiving the one or more DNS query responses further involves sending, to the DNS server, a first corresponding DNS query based on the DNS query; and receiving, from the DNS server, a first DNS query response having an EDNS extension which includes the application identifier associated with the application. In other implementations, the DNS server utilizes a DNS-AS mechanism, and sending the one or more corresponding DNS queries and receiving the one or more DNS query responses further involves sending, to the DNS server, a first corresponding DNS query based on the DNS query; receiving, from the DNS server, a first DNS query response which includes the IP address; sending, to the DNS server, a second corresponding DNS query which indicates a request for metadata associated with the application; and receiving, from the DNS server, a second DNS query response which includes the metadata associated with the application, the metadata including the application identifier associated with the application.

At the control plane function configured to manage sessions at the user plane function, the method may involve maintaining access to a stored mapping between a plurality of application identifiers and a plurality of QoS policies, each QoS policy of the plurality of QoS policies being associated with a respective one of a plurality of 5QIs; in response to receiving the message for reporting: selecting, according to the stored mapping, one of the plurality of QoS policies corresponding to the application identifier; sending one or more radio-side messages for creating the dedicated QoS Flow in the mobile network according to the selected QoS policy; and sending, to the user plane function, a message which indicates a session modification request for configuring one or more rules of the selected QoS policy at the user plane function for the dedicated QoS Flow for the traffic for the application for the user device.

For the user plane function, a computing device may comprise one or more network interfaces to connect in a mobile network; one or more processors; one or more memory elements coupled to the one or more processors, where the one or more memory elements are for storing instructions executable on the one or more processors for operation as the user plane function including the operation as described above. A computer program product may comprise a non-transitory computer readable medium; instructions stored in the non-transitory computer readable medium, where the instructions are executable on one or more processors for operation as the user plane function and including the operation as described above.

In another illustrative example, a method of a controller or an AP configured for use in a wireless network may involve receiving, from a user device operative via the AP, a DNS query for an application; sending, to a DNS server, one or more corresponding DNS queries based on the DNS query; receiving, from the DNS server, one or more DNS query responses in response to the one or more corresponding DNS queries, where the one or more DNS query responses include an IP address and metadata including an application identifier associated with the application; and setting, in the AP, a prioritized queuing of traffic for the application according to a selected UP value associated with the application identifier. The selected UP value may comprise a selected one of a plurality of UP values, each UP value of the plurality of UP values being associated with a respective one of a plurality of ACs. In some implementations, the method may further involve maintaining access to a stored mapping between a plurality of application identifiers and a plurality of UP values; and in response to receiving the metadata including the application identifier, selecting, according to the stored mapping, one of the plurality of UP values corresponding to the application identifier. In some implementations, the metadata may further comprise the selected UP value associated with the application identifier. When the method is performed by the controller, the setting of the prioritized queuing of traffic for the application may further involve sending, to the AP, one or more messages for setting the prioritized queuing of traffic for the application according to the selected UP value associated with the application identifier.

In some implementations, the DNS server is configured with EDNS, and sending the one or more corresponding DNS queries and receiving the one or more DNS query responses further involves sending, to the DNS server, a first corresponding DNS query based on the DNS query; and receiving, from the DNS server, a first DNS query response having an EDNS extension which includes the application identifier associated with the application. In other implementations, the DNS server utilizes a DNS-AS mechanism, and sending the one or more corresponding DNS queries and receiving the one or more DNS query responses further involves sending, to the DNS server, a first corresponding DNS query based on the DNS query; receiving, from the DNS server, a first DNS query response which includes the IP address; sending, to the DNS server, a second corresponding DNS query which indicates a request for metadata associated with the application; and receiving, from the DNS server, a second DNS query response which includes the metadata associated with the application, the metadata including the application identifier associated with the application.

For the controller or the AP, a computing device may comprise one or more network interfaces to connect in a wireless network; one or more processors; one or more memory elements coupled to the one or more processors, where the one or more memory elements are for storing instructions executable on the one or more processors for operation as the controller or the AP including the operation as described above. A computer program product may comprise a non-transitory computer readable medium; instructions stored in the non-transitory computer readable medium, where the instructions are executable on one or more processors for operation as the controller or the AP and including the operation as described above.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any LAN, virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, IoT network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A method comprising:
a user plane function configured for use in a mobile network,
receiving, from a user device, a domain name system (DNS) query for an application for the user device;
sending, to a DNS server, one or more corresponding DNS queries based on the DNS query;
receiving, from the DNS server, one or more DNS query responses in response to the one or more corresponding DNS queries, the one or more DNS query responses including an IP address and metadata including an application identifier associated with the application;
sending, to a control plane function, a message for reporting which includes the application identifier associated with the application;
at the control plane function,
in response to receiving the message for reporting, selecting one of a plurality of Quality of Service (QoS) policies corresponding to the application identifier; and
creating a dedicated QoS Flow for traffic for the application for the user device via the user plane function according to the selected QoS policy, which includes sending, to the user plane function, a message which indicates a session modification request for configuring one or more rules associated with the selected QoS policy for the dedicated QoS Flow.

2. The method of claim 1, wherein each QoS policy of the plurality of QoS policies is associated with a respective one of a plurality of 5G QoS Indicators (5QIs).

3. The method of claim 1, wherein the metadata further includes at least one of 5G QoS Indicator (5QI), a Resource Type, a Packet Error Rate, a Packet Delay Budget, a Default Priority Level, a Default Maximum Data Burst Volume, and a Default Averaging Window.

4. The method of claim 1, further comprising:
at the user plane function,
receiving, from the control plane function, the message which indicates the session modification request for creating the dedicated QoS Flow for the traffic for the application for the user device, the message which indicates the session modification request including the one or more rules associated with the selected QoS policy for the dedicated QoS Flow;
configuring the one or more rules for the dedicated QoS Flow for processing the traffic for the application for the user device; and
sending, to the control plane function, a message which indicates a session modification response.

5. The method of claim 1, wherein the DNS server is configured with Extension mechanisms for DNS (EDNS), and wherein sending the one or more corresponding DNS queries and receiving the one or more DNS query responses further comprises:
sending, to the DNS server, a first corresponding DNS query based on the DNS query; and
receiving, from the DNS server, a first DNS query response having an EDNS extension which includes the application identifier associated with the application.

6. The method of claim 1, wherein the DNS server comprises a DNS as Authoritative Source (DNS-AS) mechanism, and wherein sending the one or more corresponding DNS queries and receiving the one or more DNS query responses further comprises:

sending, to the DNS server, a first corresponding DNS query based on the DNS query;
receiving, from the DNS server, a first DNS query response which includes the IP address;
sending, to the DNS server, a second corresponding DNS query which indicates a request for metadata associated with the application; and
receiving, from the DNS server, a second DNS query response which includes the metadata associated with the application, the metadata including the application identifier associated with the application.

7. The method of claim 1, further comprising:
at the control plane function,
maintaining access to a stored mapping between a plurality of application identifiers and the plurality of QoS policies, each QoS policy of the plurality of QoS policies being associated with a respective one of a plurality of 5G QoS Indicators (5QIs).

8. A computing device comprising:
one or more network interfaces to connect in a mobile network;
one or more processors;
one or more memory elements coupled to the one or more processors;
the one or more memory elements for storing instructions executable on the one or more processors for operation as a user plane function including:
receiving, from a user device, a domain name system (DNS) query for an application for the user device;
sending, to a DNS server having a DNS as Authoritative Source (DNS-AS) mechanism, a first corresponding DNS query based on the DNS query;
receiving, from the DNS server, a first DNS query response which includes the IP address;
sending, to the DNS server, a second corresponding DNS query which indicates a request for metadata associated with the application;
receiving, from the DNS server, a second DNS query response which includes the metadata associated with the application, the metadata including the application identifier associated with the application; and
sending, to a control plane function, a message for reporting which includes the application identifier associated with the application,
wherein, in response to the message for reporting, a dedicated Quality of Service (QoS) Flow is created for traffic for the application for the user device via the user plane function according to a selected QoS policy associated with the application identifier.

9. The computing device of claim 8, wherein the instructions are executable on the one the one or more processors for operation as the user plane function further for:
receiving, from the control plane function, a message which indicates a session modification request for creating the dedicated QoS Flow for the traffic for the application for the user device, the message which indicates the session modification request including one or more rules associated with the selected QoS policy for the dedicated QoS Flow;
configuring the one or more rules for the dedicated QoS Flow for processing the traffic for the application for the user device; and
sending, to the control plane function, a message which indicates a session modification response.

10. The computing device of claim 8, which is operative with the control plane function which is configured for:

selecting one of a plurality of QoS policies corresponding to the application identifier; and creating a dedicated QoS Flow for traffic for the application for the user device via the user plane function according to the selected QoS policy.

11. The computing device of claim 10, which is operative with the control plane function which is configured further for:

maintaining access to a stored mapping between a plurality of application identifiers and the plurality of QoS policies, each QoS policy of the plurality of QoS policies being associated with a respective one of a plurality of 5G QoS Indicators (5QIs).

12. The computing device of claim 8, which is configured for use in the mobile network which is part of an enterprise private 5G network, and wherein:

communications are performed over a secure encrypted channel with the DNS server which is part of a secure internet gateway of a cloud infrastructure.

13. A method comprising:

at a user plane function configured for use in a mobile network, receiving, from a user device, a domain name system (DNS) query for an application for the user device;

sending, to a DNS server having a DNS as Authoritative Source (DNS-AS) mechanism, a first corresponding DNS query based on the DNS query;

receiving, from the DNS server, a first DNS query response which includes the IP address;

sending, to the DNS server, a second corresponding DNS query which indicates a request for metadata associated with the application;

receiving, from the DNS server, a second DNS query response which includes the metadata associated with the application, the metadata including the application identifier associated with the application; and sending, to a control plane function, a message for reporting which includes the application identifier associated with the application, wherein, in response to the message for reporting, a dedicated Quality of Service (QoS) Flow is created for traffic for the application for the user device via the user plane function according to a selected QoS policy associated with the application identifier.

14. The method of claim 13, further comprising:

at the user plane function, receiving, from the control plane function, a message which indicates a session modification request for creating the dedicated QoS Flow for the traffic for the application for the user device, the message which indicates the session modification request including one or more rules associated with the selected QoS policy for the dedicated QoS Flow;

configuring the one or more rules for the dedicated QoS Flow for processing the traffic for the application for the user device; and sending, to the control plane function, a message which indicates a session modification response.

15. The method of claim 13, further comprising:

at the control plane function, selecting one of a plurality of QoS policies corresponding to the application identifier; and creating a dedicated QoS Flow for traffic for the application for the user device via the user plane function according to the selected QoS policy.

16. The method of claim 15, further comprising:

at the control plane function, maintaining access to a stored mapping between a plurality of application identifiers and the plurality of QoS policies.

17. The method of claim 16, wherein each QoS policy of the plurality of QoS policies is associated with a respective one of a plurality of 5G QoS Indicators (5QIs).

18. The method of claim 16, wherein the user plane function comprises a user plane function (UPF) and the control plane function comprises a session management function (SMF).

19. The method of claim 13, wherein the mobile network is part of an enterprise private 5G network, and wherein:

communications are performed over a secure encrypted channel with the DNS server which is part of a secure internet gateway of a cloud infrastructure.

20. The method of claim 13, wherein the metadata further includes at least one of 5G QoS Indicator (5QI), a Resource Type, a Packet Error Rate, a Packet Delay Budget, a Default Priority Level, a Default Maximum Data Burst Volume, and a Default Averaging Window.

\* \* \* \* \*